United States Patent
Chaurasia et al.

(10) Patent No.: US 11,580,701 B2
(45) Date of Patent: Feb. 14, 2023

(54) APPARATUS AND METHOD FOR DISPLAYING CONTENTS ON AN AUGMENTED REALITY DEVICE

(71) Applicant: SAMSUNG ELECTRONICS CO., LTD., Suwon-si (KR)

(72) Inventors: Gaurav Chaurasia, Noida (IN); Ritesh Shreeshreemal, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 190 days.

(21) Appl. No.: 16/796,318

(22) Filed: Feb. 20, 2020

(65) Prior Publication Data

US 2020/0265649 A1    Aug. 20, 2020

(30) Foreign Application Priority Data

Feb. 20, 2019 (IN) .............................. 201911006743

(51) Int. Cl.
  *G06T 19/00* (2011.01)
  *G06F 3/01* (2006.01)
  *G06T 7/70* (2017.01)

(52) U.S. Cl.
  CPC ............ *G06T 19/006* (2013.01); *G06F 3/012* (2013.01); *G06F 3/013* (2013.01); *G06T 7/70* (2017.01)

(58) Field of Classification Search
  None
  See application file for complete search history.

(56) References Cited

U.S. PATENT DOCUMENTS

| | | |
|---|---|---|
| 9,336,602 B1 | 5/2016 | Chang et al. |
| 9,501,873 B2 | 11/2016 | Salter et al. |
| 9,633,479 B2 | 4/2017 | Grasso et al. |

(Continued)

FOREIGN PATENT DOCUMENTS

| | | |
|---|---|---|
| EP | 1 422 922 A2 | 5/2004 |
| EP | 2 847 648 | 3/2015 |

(Continued)

OTHER PUBLICATIONS

Written Opinion (PCT/ISA/237) issued by the International Searching Authority in corresponding International Application No. PCT/KR2020/002502, dated Jun. 17, 2020.

(Continued)

*Primary Examiner* — Sarah Le
(74) *Attorney, Agent, or Firm* — Sughrue Mion, PLLC

(57) ABSTRACT

A system for displaying contents on an augmented reality (AR) device comprises a capturing module configured to capture a field of view of a user, a recording module configured to record the captured field of view, a user input controller configured to track a vision of the user towards one or more objects and a server. The server comprises a determination module, an identifier, and an analyser. The determination module is configured to determine at least one object of interest. The identifier is configured to identify a frame containing disappearance of the determined object of interest. The analyser is configured to analyse the identified frame based on at least one disappearance of the object of interest, and generate analysed data. The display module is configured to display a content of the object of interest on the AR device.

19 Claims, 46 Drawing Sheets

(56) References Cited

U.S. PATENT DOCUMENTS

| | | | |
|---|---|---|---|
| 2009/0214080 A1* | 8/2009 | Hamza | G06K 9/0063 |
| | | | 382/103 |
| 2012/0105473 A1* | 5/2012 | Bar-Zeev | G06T 7/70 |
| | | | 345/633 |
| 2015/0006278 A1* | 1/2015 | Di Censo | G06V 20/597 |
| | | | 705/14.43 |
| 2015/0113454 A1 | 4/2015 | McLaughlin | |
| 2015/0130711 A1* | 5/2015 | Lee | G02B 27/017 |
| | | | 345/156 |
| 2015/0379422 A1 | 12/2015 | Chandler | |
| 2016/0219036 A1* | 7/2016 | Devkar | H04L 63/083 |
| 2016/0267717 A1* | 9/2016 | Bar-Zeev | G02B 27/017 |
| 2016/0358383 A1* | 12/2016 | Gauglitz | G06T 19/006 |
| 2016/0371886 A1* | 12/2016 | Thompson | G06F 3/013 |
| 2017/0161950 A1* | 6/2017 | Seder | G02B 27/0179 |
| 2017/0242481 A1* | 8/2017 | Lu | G06F 3/04842 |
| 2017/0337352 A1 | 11/2017 | Wiliams | |
| 2018/0211112 A1 | 7/2018 | Asbun et al. | |
| 2019/0007750 A1* | 1/2019 | Tillman, Jr. | G06F 3/011 |
| 2019/0347806 A1* | 11/2019 | Vajapey | G06T 7/20 |

FOREIGN PATENT DOCUMENTS

| | | |
|---|---|---|
| KR | 10-1705988 B1 | 2/2017 |
| WO | 2013/169237 A1 | 11/2013 |
| WO | 2018/217470 A1 | 11/2018 |

OTHER PUBLICATIONS

International Search Report (PCT/ISA/210), issued by International Searching Authority in corresponding International Application No. PCT/KR2020/002502, dated Jun. 17, 2020.

Purves D, Augustine GJ, Fitzpatrick D, et al., "Types of Eye Movements and Their Functions", Neuroscience, 2nd edition, 2001, 2 pages total.

Communication dated Jan. 13, 2021 by the Intellectual Property Office of India in counterpart Indian Patent Application No. 201911006743.

Communication dated Feb. 24, 2022 by the European Patent Office in European Patent Application No. 20758615.7.

* cited by examiner

APPARATUS AND METHOD FOR DISPLAYING CONTENTS ON AN AUGMENTED REALITY DEVICE

CROSS REFERENCE TO RELATED APPLICATION

This application is based on and claims priority under 35 U.S.C. § 119 to an Indian Patent Application No. 201911006743 filed on Feb. 20, 2019, the disclosures of which are incorporated by reference in their entireties.

TECHNICAL FIELD

The disclosure relates generally to augmented reality contents, and particularly but not exclusively, to systems and methods for displaying contents on an augmented reality (AR) device.

BACKGROUND

Augmented reality (AR) is an interactive experience of a real-world environment, whereby objects that reside in the real-world are augmented by computer-generated perceptual information across multiple sensory modalities, including visual, auditory, and the like. The augmented reality (AR) supports real-time augmentation of content by understanding user's field of view, and by using scene and object detection techniques. A user can experience the augmented reality (AR) using wearable augmented reality (AR) devices.

Existing augmented reality systems use one or more object tracking techniques, such as digital cameras and/or other optical sensors, accelerometers, global positioning systems (GPS), solid state compasses, and radio-frequency identification (RFID) systems. The object tracking techniques provide varying levels of accuracy and precision. One of the techniques is tracking of an eye gaze, and position and orientation of the user's head. The eye tracking in the AR device is the process of measuring point of gaze, where the user is looking, or the motion of eye relative to the head.

Typically, every individual has his own speed of reading/viewing/observing the information/text/object. If the object or the individual is moving, then his ability of reading/viewing/observing the information/text/object is further reduced. During motion, the user needs more time to understand the information. The user can watch any object only in a specific time interval during which the object is in his field of view and there is no obstruction between the user and the object.

An obstruction has one or more characteristics, such as the obstruction is an object big enough to hide an "object of user's interest" in part or full, so that the user could not see the object of interest properly (e.g. a train or a car comes between the user and the object of interest). The obstruction could be an environment condition like reduction in visibility due to rain, fog, etc. The obstruction could be reduction in size of the object of interest due to relative movement. Further, the obstruction could be change in state/direction/orientation of the object containing the object of interest, which causes disappearance of the object of interest (e.g. a user is interested in reading a slogan on a T-shirt and the other person wearing the t-shirt turns in other direction). The obstruction could be due to limit of user's area of vision.

The user cannot prevent any obstruction from coming in between him and the object of interest. The user does not have any control on the speed and direction of the movement of the object of interest, on the appearance (e.g., color/size, etc.) of the object of interest, and/or on environmental factors like visibility, wind, etc.

U.S. Pat. No. 9,633,479 discloses time constrained augmented reality. In the patent, a pre-defined list of items is used to identify a document from a scene. The identified document may not be of user's interest. U.S. Pat. No. 9,633,479 discloses displaying of the content related to the document till the time the document is available in the AR view. A virtual content overlaps the document in the AR. Further, a viewing time of the scene is determined according to a relative motion between the AR device and the scene. The viewing time is an estimated period of time that the scene will be visible to the AR device. Further, the virtual content is selected, based on the determined viewing time, from a predetermined range of the virtual content. For example, if a viewing time is 10 seconds, then a video whose play time is approximately 10 seconds is selected. A type of the virtual content (image/video) is selected based on a comparison of the determined viewing time, and on relative motion of the object and the user. U.S. Pat. No. 9,633,479 is related to displaying advertisement related to posters.

US Patent Application Publication No. 20150113454 discloses delivery of contextual data to a computing device using an eye tracking technology. US20150113454 replaces mouse/touch pad with eye gaze. US 20150113454 does not disclose any feature of calculating content complexity of the object of interest. In this, objects which are not in view, are not considered. Further, an action is taken as soon as the user views an object from minimum dwell time (i.e. threshold time). In this, only objects in view are considered. Furthermore, widening of pupil of an eye is not considered in identifying the object of interest.

European Patent Application Publication No. EP 1422922 is related to generating and saving data related to user's area of interest. It considers eye gaze to identify user's area of interest and saves it along with the captured images. In the publication, an object which has moved out of view is not considered. The content complexity of the user's area of interest is also not calculated. EP 1422922 discloses determination of eye information including eye gaze direction of an eye of a user of a camera system during an image capture sequence, and then associates the eye information with the captured image.

None of the prior art documents determine user's interest in seeing the disappearing object. Further, no prior art documents determine un-intentional or intentional disappearance of object of interest of the user, and perform analysis of obstruction between the user and the object of interest. None of the prior art documents prior art documents consider automatic real time identification of the object of interest and displaying the object of interest on the AR device by unintentional or intentional (despite user interest) disappearance of object of interest, any threshold eye gaze time on the object to consider it as "object of interest", the content complexity of object of interest to determine the duration required by user to properly see the object, and environment changes causing reduction in visibility of object of interest like light condition, fog, rain, as disappearance condition. The prior art documents also do not show object of interest for extended duration without user's explicit request, and do not disclose about predefined location in AR device where user can gaze to request the display of AR content of object of interest even when the object of interest is clearly visible to user.

Therefore, there is a need of a technique for displaying contents on an augmented reality (AR) device that limits the aforementioned drawbacks.

SUMMARY

This summary is provided to introduce concepts related to displaying contents on an augmented reality (AR) device. This summary is neither intended to identify essential features of the disclosure nor is it intended for use in determining or limiting the scope of the disclosure.

For example, various embodiments herein may comprise one or more systems and methods for displaying contents on an augmented reality (AR) device are provided.

According to various embodiments of the present disclosure, a computer implemented method for displaying contents on an augmented reality (AR) device. The method may comprise capturing a field of view of a user, recording the captured field of view, tracking a vision of the user towards one or more objects in the recorded field of view, determining at least one object of interest in the recorded field of view, identifying a frame containing disappearance of the determined object of interest in the recorded field of view, analysing the identified frame based on at least one disappearance of the object of interest, generating analysed data based on the analysed frame, and displaying a content of the object of interest based on the analysed data, on the augmented reality (AR) device.

According to various embodiments of the present disclosure, a computer implemented system for displaying contents on an augmented reality (AR) device comprises a memory configured to store pre-defined rules, a processor configured to cooperate with the memory, the processor being configured to generate system processing commands based on the pre-defined rules, a capturing module configured to capture a field of view of a user, a recording module configured to record the captured field of view, a user input controller configured to track a vision of the user towards one or more objects in the recorded field of view, and a server configured to cooperate with the AR device, the recording module, and the user input controller. The server may comprise a determination module configured to determine at least one object of interest in the recorded field of view, an identifier configured to cooperate with the determination module to receive the determined object of interest, wherein the identifier is configured to identify a frame containing disappearance of the determined object of interest in the recorded field of view, and an analyser configured to cooperate with the identifier to receive the identified frame, wherein the analyser is configured to analyse the identified frame based on at least one disappearance of the object of interest, and generate analysed data, and a display module configured to display a content of the object of interest based on the analysed data, on the augmented reality (AR) device.

According to various embodiments of the present disclosure, a computer implemented method for displaying contents on an augmented reality (AR) device comprise capturing a field of view of a user, tracking an eye gaze of the user towards an object of interest in the captured field of view, identifying a frame containing intentional disappearance of the object of interest in the captured field of view, analysing the identified frame based on intentional disappearance, generating analysed data based on the analysed frame, and displaying a content of the object of interest based on the analysed data, on the augmented reality (AR) device.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and modules.

Figure 1:
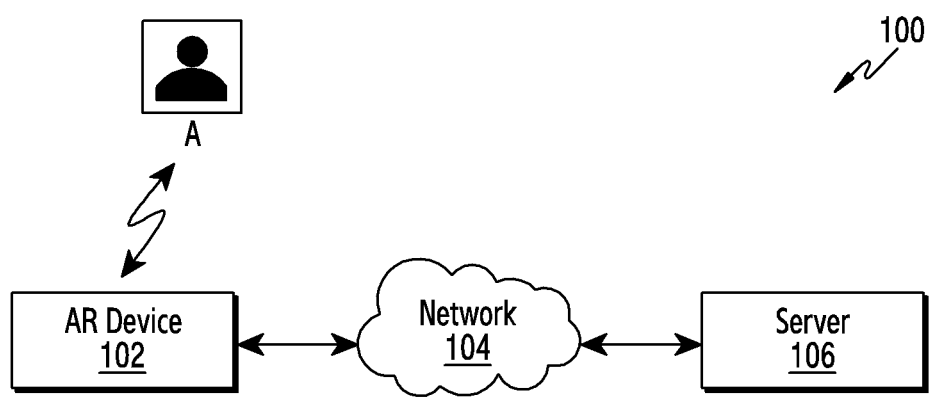
FIG. 1 illustrates a schematic diagram depicting a computer implemented system for displaying contents on an augmented reality (AR) device, according to an exemplary embodiment of the disclosure.

It should be appreciated by those skilled in the art that any block diagrams herein represent conceptual views of illustrative systems embodying the principles of the disclosure. Similarly, it will be appreciated that any flowcharts, flow diagrams, and the like represent various processes which may be substantially represented in computer readable medium and so executed by a computer or processor, whether or not such computer or processor is explicitly shown.

DETAILED DESCRIPTION

In the following description, for the purpose of explanation, specific details are set forth in order to provide an understanding of the disclosure. It will be apparent, however, to one skilled in the art that the disclosure may be practiced without these details. One skilled in the art will recognize that embodiments of the disclosure, some of which are described below, may be incorporated into a number of systems.

The various embodiments of the disclosure provide a computer implemented system and method for displaying contents on an augmented reality (AR) device.

Furthermore, connections between components and/or modules within the figures are not intended to be limited to direct connections. Rather, these components and modules may be modified, re-formatted or otherwise changed by intermediary components and modules.

References in the disclosure to "one embodiment" or "an embodiment" mean that a particular feature, structure, characteristic, or function described in connection with the embodiment is included in at least one embodiment of the invention. The appearances of the phrase "in one embodiment" in various places in the specification are not necessarily all referring to the same embodiment.

A computer implemented system (hereinafter referred to as "system") for displaying contents on an AR device provides analysing of user's viewing behavior at a moment through aye movement, head movement, and gaze time of the user which can be easily captured using eye tracking cameras present on the AR device. Further, the system also identifies whether an object in user's field of view is of his interest or not by using a plurality of parameters, such as eye gaze, eye size, pupil size enlargement, eye brows, pupil and iris movement towards the object, eye blinks, head movement, sudden high speed of head movement in the direction of object, head movement for tracking the object till the object disappears, repeatedly watching the same object with multiple short gazes, and adaptive learnt artificial intelligence (AI) based multi-model to identify user's interest in object.

The system is configured to identify user's interest in an object. With object recognition and artificial intelligence (AI) techniques, the system is configured to identify any type of obstruction between the user and the object of interest. The system also determines intentional or un-intentional disappearance of object of interest.

In an embodiment, sensors of the AR device gather a user's real world interactions and communicate them to be processed and interpreted. Cameras are also located on the outside of the AR device, and visually scan to collect data about the surrounding area. The devices take this information, which often determines where surrounding physical objects are located, and then formulates a digital model to determine appropriate output. For example, in a case of Microsoft Holo-lens, specific cameras perform specific duties, such as depth sensing. Depth sensing cameras work in tandem with two "environment understanding cameras" on each side of the AR device. Another common type of camera is a standard several megapixel camera (similar to the ones used in smartphones) to record pictures, videos, and sometimes information to assist with augmentation.

In another embodiment, an eye tracking is a technique that measures eye activity and gaze movement. The eye tracking technique solves human interface problems with the AR and improves the overall visual quality of AR experiences. Different types of eye movements are being studied and used in eye gaze research and applications to collect information about user intent, cognitive processes, behavior, and attention analysis. There are different types of eye movements, such as fixations, saccades, smooth pursuit, scanpath, gaze duration, pupil size and blink, vergence, and vestibular ocular reflex.

Fixations: In fixations, the eyes are stationary between movements and a visual input. Fixations are those times when eyes essentially stop scanning about a scene, holding the central foveal vision in place so that a visual system can take in detailed information about what is being looked at. Fixation related measurement variables include total fixation duration, mean fixation duration, fixation spatial density, number of areas fixated, fixation sequences and fixation rate.

Saccades: Saccades are rapid and involuntary eye movements that occur between fixations. Measurable saccade related parameters include saccade number, amplitude and fixation-saccade ratio. Saccades can be triggered voluntarily or involuntarily. In this, both eyes move in the same direction.

Smooth pursuit is used to keep the fovea aligned with moving objects. It cannot be triggered voluntarily, in absence of a moving target.

Scanpath: The scanpath includes a series of short fixations and saccades alternating before the eyes reach a target location on the screen. The movement measures derived from the scanpath include scanpath direction, duration, length and area covered.

Gaze duration: Sum of all fixations made in a field of interest before the eyes leave that field and also the proportion of time spent in each field.

Pupil size and blink: Pupil size and blink rate are measured.

Vergence movements are used to help us focus on objects placed at different distances the left and right eye move in opposite directions.

Vestibular ocular reflex is used to maintain fovea pointed at a point of interest when the head and body are moving.

FIG. 1 illustrates a schematic diagram depicting a computer implemented system 100 for displaying contents on an AR device, according to an exemplary embodiment of the disclosure.

The system 100 comprises an AR device 102, a network 104, and a server 106.

The AR device 102 is associated with a user (A). The AR device 102 is communicatively coupled with the server 106 via the network 104. In an embodiment, the AR device 102 comprises a display screen, a global positioning system (GPS), a speaker, and a headphone or an earphone that can be worn on the ears of the user. The AR device 102 also comprises one or more sensors to sense a motion and actions of the user. In an embodiment, the sensors comprises at least one of an acceleration sensor, a tilt sensor, a gyro sensor, a three-axis magnetic sensor, and a proximity sensor.

In an embodiment, the network 104 comprises wired and wireless networks. Examples of the wired networks comprise a wide area network (WAN) or a local area network (LAN), a client-server network, a peer-to-peer network, and so forth. Examples of the wireless networks comprise Wi-Fi, a global system for mobile communications (GSM) network, and a general packet radio service (GPRS) network, an enhanced data GSM environment (EDGE) network, 802.5 communication networks, code division multiple access (CDMA) networks, Bluetooth networks or long term evolution (LTE) network, LTE-advanced (LTE-A) network or 5th generation (5G) network.

Figure 2:
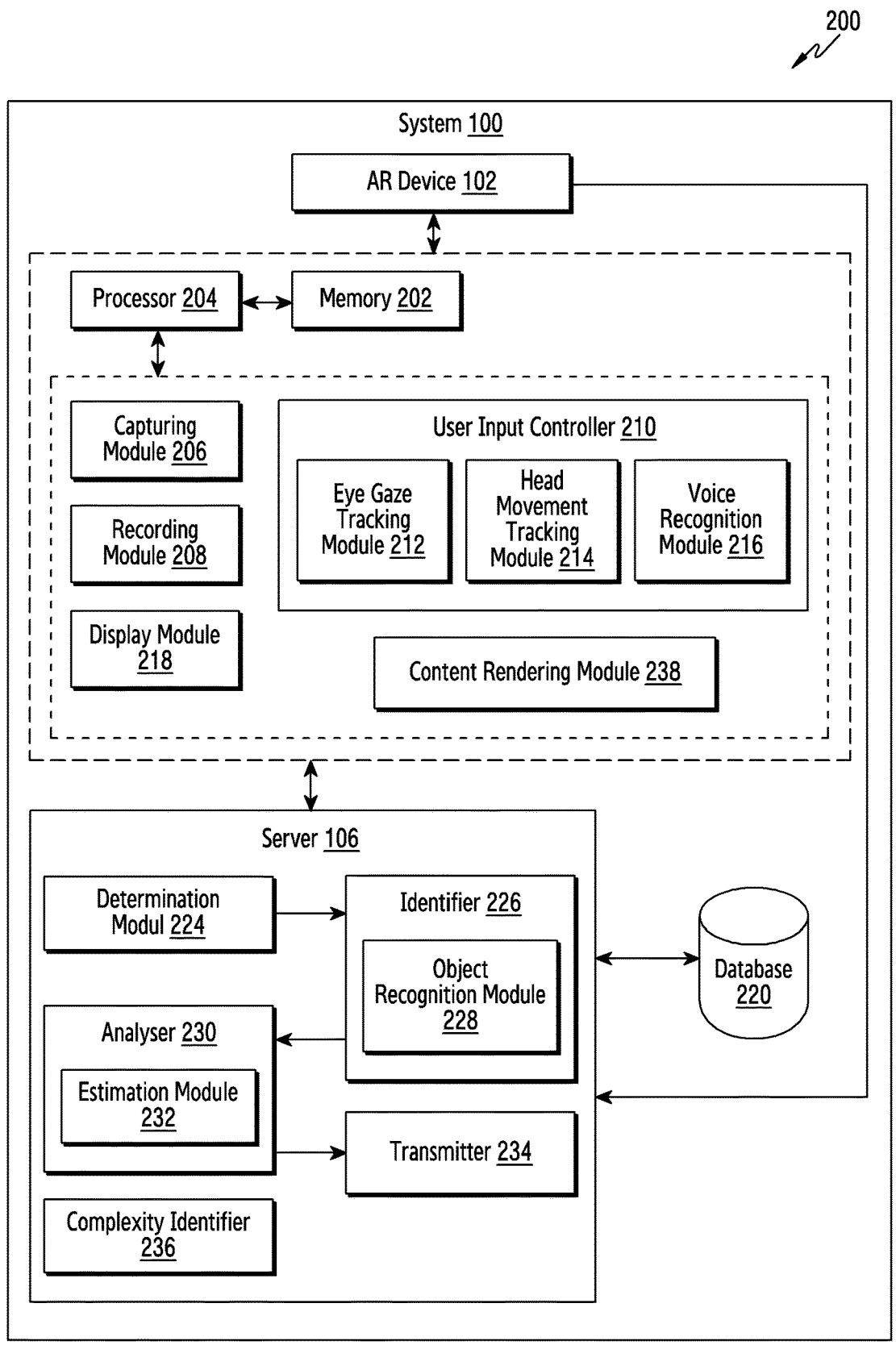
FIG. 2 illustrates a block diagram depicting the computer implemented system for displaying contents on an augmented reality (AR) device of FIG. 1, according to an exemplary embodiment of the disclosure.

FIG. 2 illustrates a block diagram 200 depicting the computer implemented system for displaying contents on an AR device 102 of FIG. 1, according to an exemplary embodiment of the disclosure.

The system 100 comprises an AR device 102, a server 106, and a database 220.

The system 100 further comprises a memory 202, a processor 204, a capturing module 206, a recording module 208, a user input controller 210, and a display module 218. In an embodiment, the memory 202, the processor 204, the capturing module 206, the recording module 208, the user input controller 210, and the display module 218 are in the vicinity of the AR device 102 or outside the AR device 102, and perform various functionalities independently.

The memory 202 is configured to store pre-determined rules related to identification of location, data extraction, determination of information, recognition of texts and images, and content complexity. In an embodiment, the memory 202 can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 202 also includes a cache memory to work with the system 100 more effectively.

The processor 204 is configured to cooperate with the memory 202 to read or load the pre-determined rules. The processor 204 is further configured to generate system processing commands. In an embodiment, the processor 204 may be implemented as one or more microprocessors, microcomputers, microcontrollers, digital signal processors, central processing units, state machines, logic circuitries, and/or any devices that manipulate signals based on operational instructions. Among other capabilities, the processor 204 is configured to fetch the pre-determined rules from the memory 202 and execute different modules of the system 100.

The capturing module 206 is configured to capture a field of view of a user. In an embodiment, the capturing module 206 comprises a camera or a scanner. The capturing module 206 is configured to capture a real-time view of the user associated with the AR device 102.

The recording module 208 is configured to cooperate with the capturing module 206 to receive the captured field of view of the user. The recording module 208 is further configured to record the captured field of view of the user.

The user input controller 210 is configured to cooperate with the recording module 208 to receive the recorded field of view. The user input controller 210 is further configured to track a vision of the user towards one or more objects in the recorded field of view. In an embodiment, the user input controller 210 is configured to track the vision of the user based on at least one of parameters including an eye gaze, direction of eye movement, direction of head movement, dilation of pupils, a number of eye blinks, an angle of rotation of head, speed of rotation of head, facial expression, widening of eye size, pupil and iris movement, voice recognition, and/or other similar parameters.

The user input controller 210 comprises an eye gaze tracking module 212, a head movement tracking module 214, and a voice recognition module 216.

The eye gaze tracking module 212 is configured to track the vision of the user by identifying an eye gaze, direction of eye movement, dilation of pupils, a number of eye blinks, facial expression, widening of eye size, pupil and iris movement, and/or other vision related parameters. The eye gaze tracking module 212 is configured to obtain the information of focus region of the user to determine on which the real object (or its augmentation) the user is currently focusing. The eye gaze tracking module 212 is configured to track the eye movement for multiple real and augmented objects with respect to the head. In an embodiment, the eye gaze tracking module 212 is configured to collect eye movement data and eye gaze time of real objects and eye gaze time of augmented content to be sent to the estimation module 232 as an input. When there is no relative movement between the user and the object of interest, there will be no or minimal eye movement. Eye will remain at a comfortable angle, generally at "looking in front" position (3D-Focus area). The user will keep on gazing at the object and an obstruction will come in between the user and the object of interest. When there is relative movement between the user and the object of interest, the user continuously turns his eye to follow the object till its disappearance behind the obstruction. Eye pupil will remain dilated at point of disappearance of the object of interest, showing interest of user in the object of interest at the point of disappearance. Number of eye blinks will remain less than normal. Eye will remain wider than usual at the point of disappearance.

The head movement tracking module 214 is configured to track direction of head movement, an angle of rotation of head, speed of rotation of head, and other head related parameters. The head movement tracking module 214 is configured to gather the information of head movement in terms of degree per second to be sent to an estimation module 232 as an input. The head movement tracking module 214 is configured to track whether the user turns his head to maximum comfortable extent to follow any object. When there is no relative movement between the user and the object of interest, there will be no or minimal head movement. Head will remain at a comfortable angle, generally at "looking in front" position (3D-Focus area). The user keeps on gazing at the object and an obstruction comes in between the user and the object. When there is relative movement between the user and the object of interest, the user continuously turns his head to follow the object till its disappearance behind the obstruction.

The voice recognition module 216 is configured to track voice recognition of the user.

In an embodiment, the system 100 also comprises the database 220. The database 220 is configured to store the recorded field of view, pre-defined time intervals, pre-defined object categories, and data related to one or more objects, pre-determined angles of rotation, and speed of rotation of the user on the at least one angle towards the one or more objects.

The server 106 is configured to cooperate with the AR device 102, the recording module 208, and the user input controller 210. The server 106 comprises a determination module 224, an identifier 226, and an analyser 230.

The determination module 224 is configured to determine at least one object of interest in the recorded field of view.

The identifier 226 is configured to cooperate with the determination module 224 to receive the determined object of interest. The identifier 226 is further configured to identify a frame containing disappearance of the determined object of interest in the recorded field of view. In an embodiment, the identifier 226 is configured to identify the frame based on intentional disappearance or un-intentional disappearance of the object of interest in the recorded field of view. In another embodiment, the identifier 226 is configured to identify the frame based on a vision time and a threshold time.

In an embodiment, the identifier 226 comprise an object recognition module 228. The object recognition module 228 is configured to detect and recognize the object of interest from the identified frame using a deep learning technique. The deep learning technique comprises an object recognition technique, a deep structured learning technique, a hierarchy learning technique, or a neural network.

The analyser 230 is configured to cooperate with the identifier to receive the identified frame. The analyser 230 is further configured to analyse the identified frame based on at least one intent disappearance, and generate analysed data. In an embodiment, the analyser 230 is configured to analyse the identified frame based on intentional disappearance or un-intentional disappearance of the object of interest in the recorded field of view. In another embodiment, the analyser 230 is configured to analyse the identified frame based on the intentional disappearance by identifying a lack of user's interest towards the one or more objects.

In another embodiment, the analyser 230 further comprises the estimation module 232. The estimation module 232 is configured to determine a probability of user's expectation in the field of view based on despite of user's interest in the object. The analyser 230 is further configured to identify lack of user's interest in the one or more objects.

In another embodiment, the analyser 230 is configured to analyse the identified frame based on the un-intentional disappearance by determining obstruction between the user and the object of interest. In an embodiment, the obstruction between the user and the object of interest is determined based on vision analysis, object identification, eye movement, head movement, head movement, or gaze fixation time for another object after disappearance of the object of interest. In an embodiment, the obstruction between the user and the object of interest is determined by using a plurality of sensors.

In an embodiment, the analyser 230 is configured to analyse the identified frame based on the intentional disappearance. The analyser 230 is configured to analyse vision of the user with respect to the object of interest for a pre-defined time interval. The analyser 230 is further configured to identify intentional non-obstructive disappearance of the object of interest using an artificial intelligence based multi-parameter model. The model comprises parameters which are related to user's eye movement, user's engagement level, companions with the user, and an object category. The analyser 230 is further configured to perform profiling of viewing data and data received from a plurality of sensors for a threshold time, and then identify a gaze at a pre-determined location of the AR device 102. In one of the embodiments, the intentional disappearance of the object is a disappearance despite the user's interest in the object.

The display module 218 is configured to display a content of the object of interest based on the analysed data, on the AR device 102. The display module 218 is configured to display a content of the object of interest that comprises a segment of the object of interest, or a modified version of the object of interest on the AR device 102. The modified version of the object of interest is generated by filtering and enhancement of the segment of the object of interest. The filtering and enhancement of the segment of the object of interest comprises filtering and enhancing an image, a video, augmented information related to the object of interest, and the combinations thereof.

The display module 218 is further configured to highlight the object of interest based on the gaze at a pre-defined location in the AR device 102, and the threshold time. In an embodiment, the threshold time is variable based on multiple parameters.

In an embodiment, the display module 218 is configured to perform mirroring of the content of the object of interest displayed on one or more computing devices, on the AR device 102, in case of un-intentional disappearance of the object of interest or intentional disappearance of the object of interest despite the user's interest, and when the user views the object of interest for more than a threshold amount of time. In an exemplary embodiment, when a user watches a display for more than a threshold amount of time, then on disappearance of the display, mirroring of the display is done with the AR device 102. For example, there is a heartbeat monitor in an operation theatre. A doctor needs to see the heartbeat monitor frequently during an operation. The doctor wears an AR device 102, and looks at the heartbeat monitor for a threshold amount of time. The doctor turns his head away from the heartbeat monitor and starts an operation. A live display of the heartbeat monitor is shown in the AR device 102 of the doctor. So he need not turn his head towards the heartbeat monitor every time to see heartbeat data. Multiple computing devices can mirror to a single AR device.

In an embodiment, the server 106 comprises a transmitter 234. The transmitter is configured to cooperate with the analyser 230 to receive the analysed data. The transmitter 234 is further configured to transmit the analysed data to the AR device 102. In an embodiment, the transmitter 234 is further configured to transmit the analysed data from the AR device 102 to another AR device by using location of another AR device, Artificial Intelligence (AI) technique, or by using profile. In an embodiment, the display module 218 is configured to display a content of the object of interest based on the analysed data, on another AR device.

In an embodiment, the server 106 also comprises a complexity identifier 236. The complexity identifier 236 is configured to compute the time required by the user to view the object of interest based on the total time required by the user to view the object of interest and duration for which the user has viewed the object of interest before the disappearance. In an embodiment, computing the time required by the user for viewing the object of interest is determined by subtracting duration for which the user has viewed the object of interest before disappearance from the total time required by the user to view the object of interest.

In another embodiment, the complexity identifier 236 determines amount of information (e.g., object complexity) in the user's object of interest, up to satisfactory level, thus calculating the total time required by user to properly see/comprehend the object of interest. In such scenario, the object of interest is available in the user's view for duration less than the total time required by the user to properly see/comprehend the object and the user is still interested in the object of interest. The complexity identifier 236 provides a digital image or multimedia content (e.g., video) of the object of user's interest on the AR device 102, for the extra time user needs to properly see/comprehend the object of interest, for calculated duration. Formula for calculation of the duration is as follows:

Duration=(Total time required to see the object as calculated by system)−(Duration for which user has already seen the object)

In an exemplary embodiment, Table 1 illustrates a list, but is not limited to, of some of the parameters, for calculating the content complexity. The complexity identifier 236 can assign different weightage to different parameters in different scenarios to calculate the content complexity accurately.

TABLE 1

| Content complexity parameters for an object | Cause of Increase in complexity | Increase the complexity by |
| --- | --- | --- |
| Number of words | With every increase of 1 word | C1 |
| Language of content | If language is not mother tongue | C2 |
| Font size | With reduction in font by size 1 | C3 |
| Font style of content | If font is calligraphic | C4 |
| Number of different hard words | For every single hard word | C5 |
| Average sentence length | For difference of 1 from the sentence length of 6 words | C6 |
| Angle of viewing | 0 for 90 degree. After that for every reduction of 5 degrees | C7 |
| Visibility level | 0 for sunny day. For reduction of 1 candela/sqm | C8 |
| Distance of object | 0 for 5 m. For increase of every 1 m | C9 |

TABLE 1-continued

| Content complexity parameters for an object | Cause of Increase in complexity | Increase the complexity by |
| --- | --- | --- |
| Relative speed of movement of object | 0 for 10 km/hr. for every increase of 2 km/hr. | C10 |
| Direction of movement of object | 0 for moving towards user. For every deviation of 2 degrees | C11 |
| Obstacles between object and user | 0 if object is not blocking the view. For every 5% of object blocked | C12 |
| Action/Motion in object | 0 if there is no rotation. For every 5 degrees of rotation | C13 |
| No of identifiable content in object | for every identifiable content | C14 |
| Different types of identifiable content in object | For every type | C15 |
| Speed of perception of user | 0 for standard speed. For every unit of reduction | C16 |
| Reading speed of user | 0 for 150 words per minutes. For every reduction of 10 words per minute | C17 |
| Fatigue level of user | Dull Drowsy | C18 |
| Fatigue level of user | Exhausted | C19 |
| Fatigue level of user | Mental decline | C20 |
| Fatigue level of user | Feeling of incongruity in body | C21 |
| Fatigue level of user | Dysfunction of nervous system | C22 |

In another embodiment, the system 100 comprises a content rendering module 238. The content rendering module 238 is configured to render the positioning of the content on the AR device 102 based on the gaze of the user, user's preferences, and current view content.

In another embodiment, the capturing module 206 is configured to capture a field of view of a user. The user input controller 210 is configured to track an eye gaze of the user towards an object of interest in the captured field of view. The identifier 226 is configured to identify a frame containing intentional disappearance of the object of interest in the captured field of view. The analyser 230 is configured to analyse the identified frame based on the intentional disappearance, and generate analysed data. The display module 218 is configured to display a content of the object of interest based on the analysed data, on the AR device 102.

In another embodiment, the capturing module 206 is configured to capture a field of view of a user. The recording module 208 is configured to record the captured field of view. The user input controller 210 is configured to track an eye gaze of the user towards an object of interest in the recorded field of view. The identifier 226 is configured to identify a frame containing at least one of un-intentional disappearance of the object of interest, or intentional disappearance despite the interest in the recorded field of view. The analyser 230 is configured to analyse the identified frame based on the at least one of un-intentional disappearance of the object of interest, or intentional disappearance despite the interest, and generate analysed data. The display module 218 is configured to display a content of the object of interest based on the analysed data, on the AR device 102.

In an embodiment, the system 100 identifies un-intentional or intentional disappearance of the object of interest and determining the user's interest in seeing the object of interest, even after the object disappears. More specifically, the system 100 provides a digital image or multimedia content of the object of interest on the AR device 102 (e.g., an AR glass).

In an exemplary embodiment, when the user is interested to see an object in the surrounding environment on a different surrounding environment, mainly because of the disappearance of the object of interest. The system 100 determines whether the disappearance of the object of interest is un-intentional or intentional. The system 100 considers following disappearance scenarios:

Un-intentional disappearance (obstruction based): In this scenario, disappearance of the object of interest is not under the user's control. The object disappears due to factors which are out of the user's control. For example, an obstruction comes in between the user and the object of interest, or the user wants to see the object of interest but the object of interest moves behind a wall. In an embodiment, the obstruction between the user and the object of interest is determined using vision analysis, object identification, monitoring eye and head movement using data from the various sensors of the AR device 102. If the disappearance is un-intentional (i.e., due to obstruction), the multimedia content for the object of interest is created and displayed on the AR device 102.

Intentional disappearance (Non-obstruction based) despite of user's interest in the object: Following are some of exemplary embodiments for the intentional disappearance:

i. A user moves gaze to some other object while the object of interest is still available in his view. For example, a user avoids direct eye contact with the person while watching him/her.

ii. A user is forced to remove gaze from the object of interest because the object goes beyond comfortable viewing range of user. For example, the object of interest walks past the user and goes behind him.

iii. A user can gaze at a predefined location in the AR device 102 after removing his gaze from the object of interest.

In this scenario, after the user removes his gaze from the object of interest, the user interest in seeing the object of interest is determined by using an AI model, profiling user data or data from various sensors of the AR device 102. In an embodiment, the multimedia content is created for the object of interest and displayed in the AR device 102.

Intentional disappearance (Non-obstruction based) due to lack of user's interest in the object: A user intentionally moves gaze from the object as he is no longer interested in watching the object. In this scenario, after the user removes his gaze from the object, lack of user interest in seeing the object of interest is determined by profiling user data or data from the various sensors of AR device 102.

In an embodiment, the system 100 is configured to identify the object of interest of the user based on data from various sensors in the AR device 102. Identification of the object under gaze and determination of duration of gaze on the object can be identified using various sensors available in the AR device 102. Below is a list of sensor data which can be used for this purpose:

i. Eye and Head Movement
   a. Head Movement
   b. Eye ball Movement
   c. Pupil Dilation
   d. Number of eye blinks
   e. Widening of eyes
   f. Pupil and iris movement ii. Gaze time
   a. Fixation
   b. Saccades
   c. Smooth Pursuit
   d. Cumulative duration of gaze on the object When the user gazes at an object for more than a threshold time, the object is considered as the object of interest. Total time for which the user has gazed an object is tracked.

Figure 3:
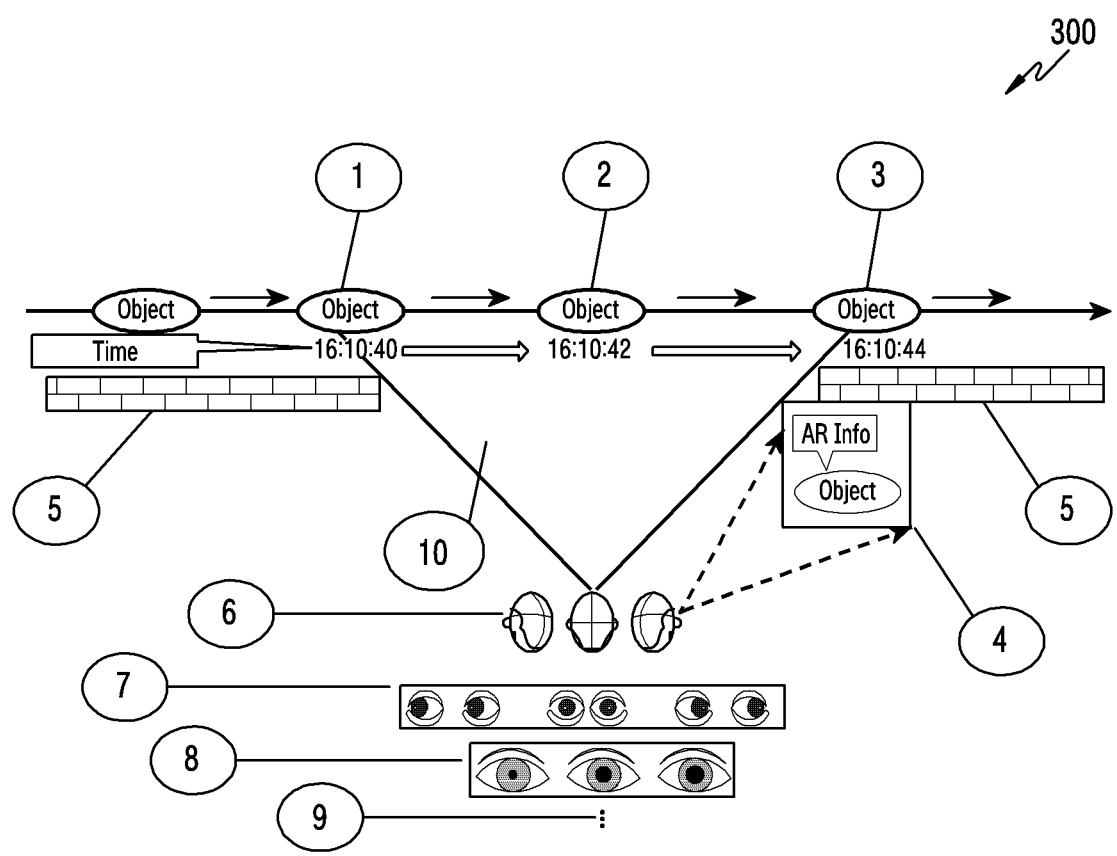
FIG. 3 illustrates a schematic diagram depicting un-intentional disappearance, according to an exemplary embodiment of the disclosure.

FIG. 3 illustrates a schematic diagram 300 depicting un-intentional disappearance, according to an exemplary embodiment of the disclosure.

FIG. 3 illustrates an un-intentional disappearance, which is based on an obstruction. The obstruction is due to a wall 5. Specifically, in FIG. 3, when the object of interest is disappeared from the user's field of view 10, the system 100 displays multimedia content of the object of interest, when the object of interest has disappeared behind the wall 5. At a point 1, an object appears in the user's field of view 10. The user starts watching the object continuously at time t1 (i.e., at 16:10:40). At a point 2, the user gazes at the object for threshold time, and it becomes an "object of interest". In an embodiment, the user gazes at the object for two seconds, for example, the user gazes at the object of interest from t1 to t2 (i.e., t2=16:10:42). The system automatically calculates a total time of gazing the object of interest (t2−t1). At a point 3, the user was still watching the object of interest, but the object of interest goes behind obstacle at a time t3 (i.e., at 16:10:44). This point 3 is known as un-intentional disappearance. The obstacle may be the wall 5. At a point 4, the system 100 is configured to determine that the disappearance of the object of interest from the user's view was un-intentional, as the obstacle comes between the user and the object of interest. The system 100 then displays a content (i.e. a digital image or multimedia content) of the object of interest on the AR device 102. In an embodiment, while following the object of interest, the system 100 tracks direction of head movement as shown in a point 6, direction of eye gaze at shown in a point 7, change in size of pupil on seeing the object of interest as shown in point 8, and other parameters such as blinking, facial expressions, etc. as shown in point 9.

Figure 4:
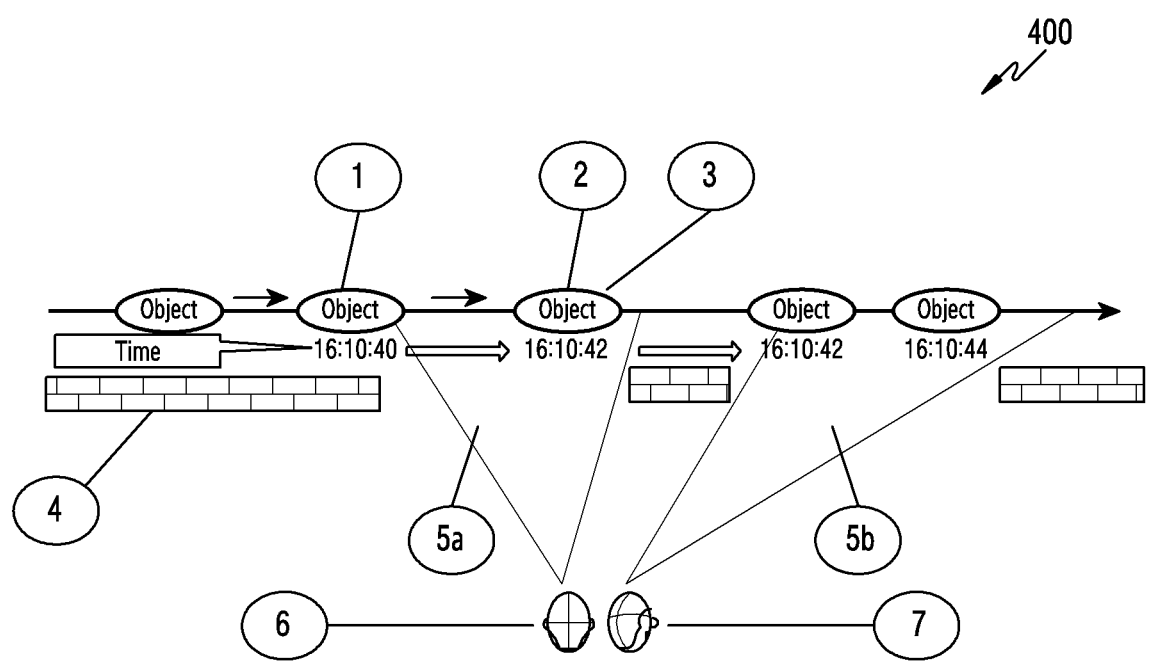
FIG. 4 illustrates a schematic diagram depicting intentional disappearance of a first object (object 1), according to an exemplary embodiment of the disclosure.

FIG. 4 illustrates a schematic diagram 400 depicting intentional disappearance of a first object (object 1), according to an exemplary embodiment of the disclosure.

FIG. 4 illustrates an intentional disappearance and a user shows lack of interest in an object. In FIG. 4, the user moves his gaze from one object to another object. At a point 1, a first object appears in the user's field of view 5a. The user starts watching the first object as shown in point 6 continuously at time t1 (i.e., at 16:10:40). At a point 2, the user gazes at the object for a threshold time, and it becomes an "object of interest". In an embodiment, the user gazes at the object for two seconds, for example, the user gazes at the object of interest from t1 to t2 (t2=16:10:42). The system automatically calculates a total time of gazing the object of interest (t2−t1). At a point 3, the user turns his head from the first object even before the first object goes out of sight and starts gazing at a second object continuously as shown in point 7 at a time t3 (i.e., at 16:10:44). This point 3 is known as intentional disappearance of the first object from the user's field of view 5a. The obstacle may be a wall 4. Since the user was watching the first object continuously from the user's field of view 5a, and then turned his head to gaze at the second object, the disappearance of the first object from the user's field of view 5a is intentional, as the user had chance of continuously watching the first object for some time while the obstruction comes 4, but he moves his gaze to see the another object from the field of view 5b. In this case, the first object is not displayed on the AR device 102, even though the user watched the object for threshold time.

Figure 5:
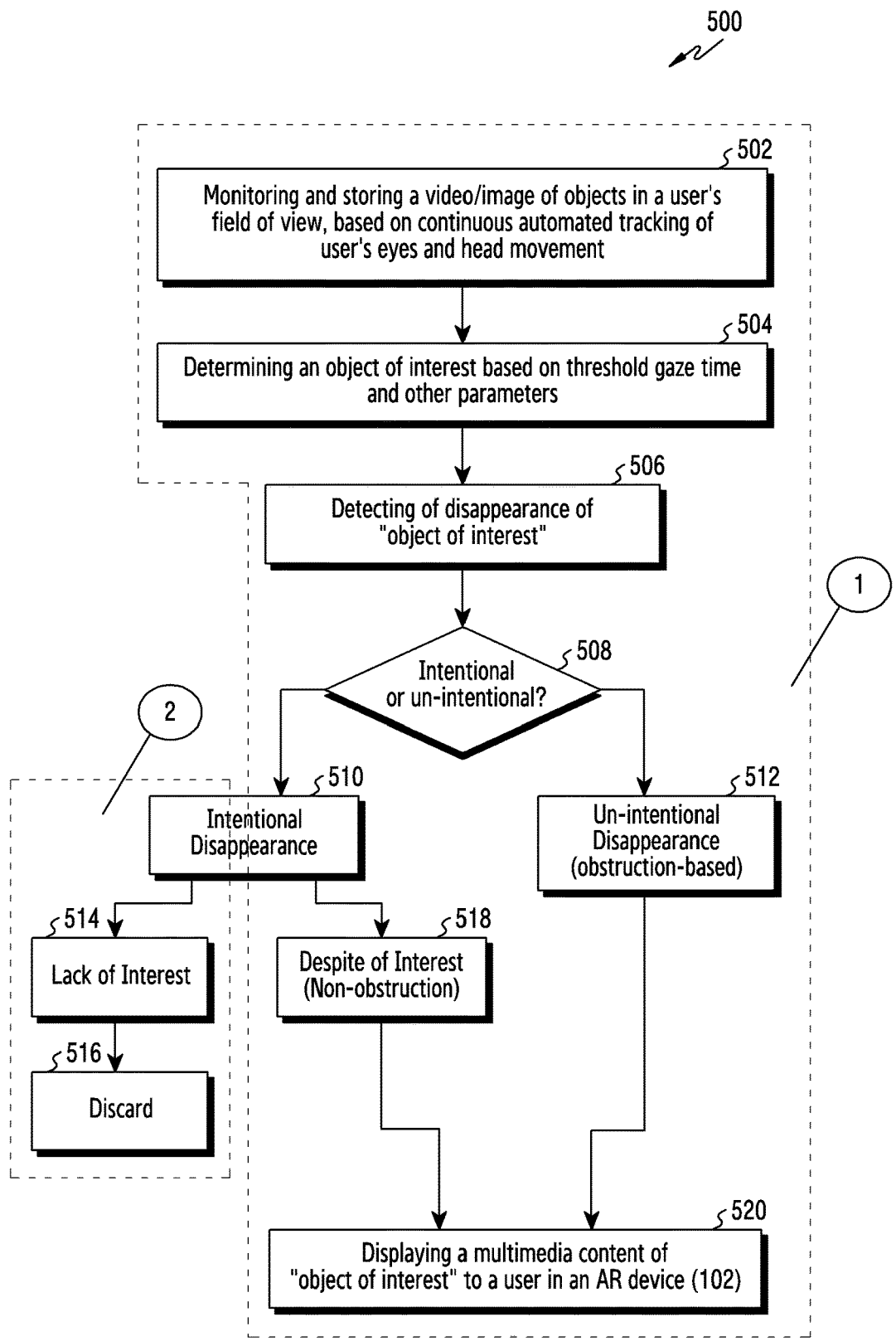
FIG. 5 illustrates a flow diagram depicting a process for displaying contents on an augmented reality (AR) device, according to an exemplary embodiment of the disclosure.

FIG. 5 illustrates a flow diagram 500 depicting a process for displaying contents on an AR device, according to an exemplary embodiment of the disclosure.

The flow diagram 500 starts from step 502 of monitoring and storing a video/image of objects in a user's field of view, based on continuous automated tracking of the user's eyes and movement. In an embodiment, the capturing module 206 is configured to capture a video/image of a plurality of objects in the user's field of view, and the recording module 208 is configured to record, monitor, and store the video/image of objects in a user's field of view. The user input controller 210 is configured to track the user's eyes and movement.

At step 502, the process comprises determining an object of interest based on a threshold gaze time and other parameters. In an embodiment, the determination module 224 determines an object of interest based on a threshold gaze time and other parameters.

At step 504, the process comprises detecting of disappearance of "object of interest". In an embodiment, an identifier 226 is configured to detect the disappearance of the object of interest.

At step 508, the process comprises checking whether the disappearance of the object is intentional or un-intentional. In an embodiment, the identifier 226 is configured to identify whether the disappearance of the object is intentional or un-intentional. If the disappearance of the object of interest is intentional as shown in step 510, then the intentional disappearance is also identified by two conditions, i.e., lack of user's interest as shown in step 514, or despite of interest as shown in a step 518. In an embodiment, the despite of interest is based on non-obstruction. If the intentional disappearance is due to lack of user's interest, the system 100 discards the object of interest from further processing 516, and the user will not get disturbed unnecessarily at point 2. If the disappearance of the object of interest is based on despite of interest as shown in step 518, the system displays a multimedia content of "object of interest" to the user in the AR device 102, as shown in step 520. In an embodiment, the display module 218 is configured to display a multimedia content of "object of interest" to the user in the AR device 102.

If the disappearance of the object of interest is un-intentional as shown in step 512, the system displays a multimedia content of "object of interest" to the user in the AR device 102, as shown in step 520. In an embodiment, the display module 218 is configured to display a multimedia content of "object of interest" to the user in the AR device 102. In an embodiment, the system 100 provides assistive display when the user requires it for interesting object viewing till the time the user is interested in viewing it at point 1.

Figure 6:
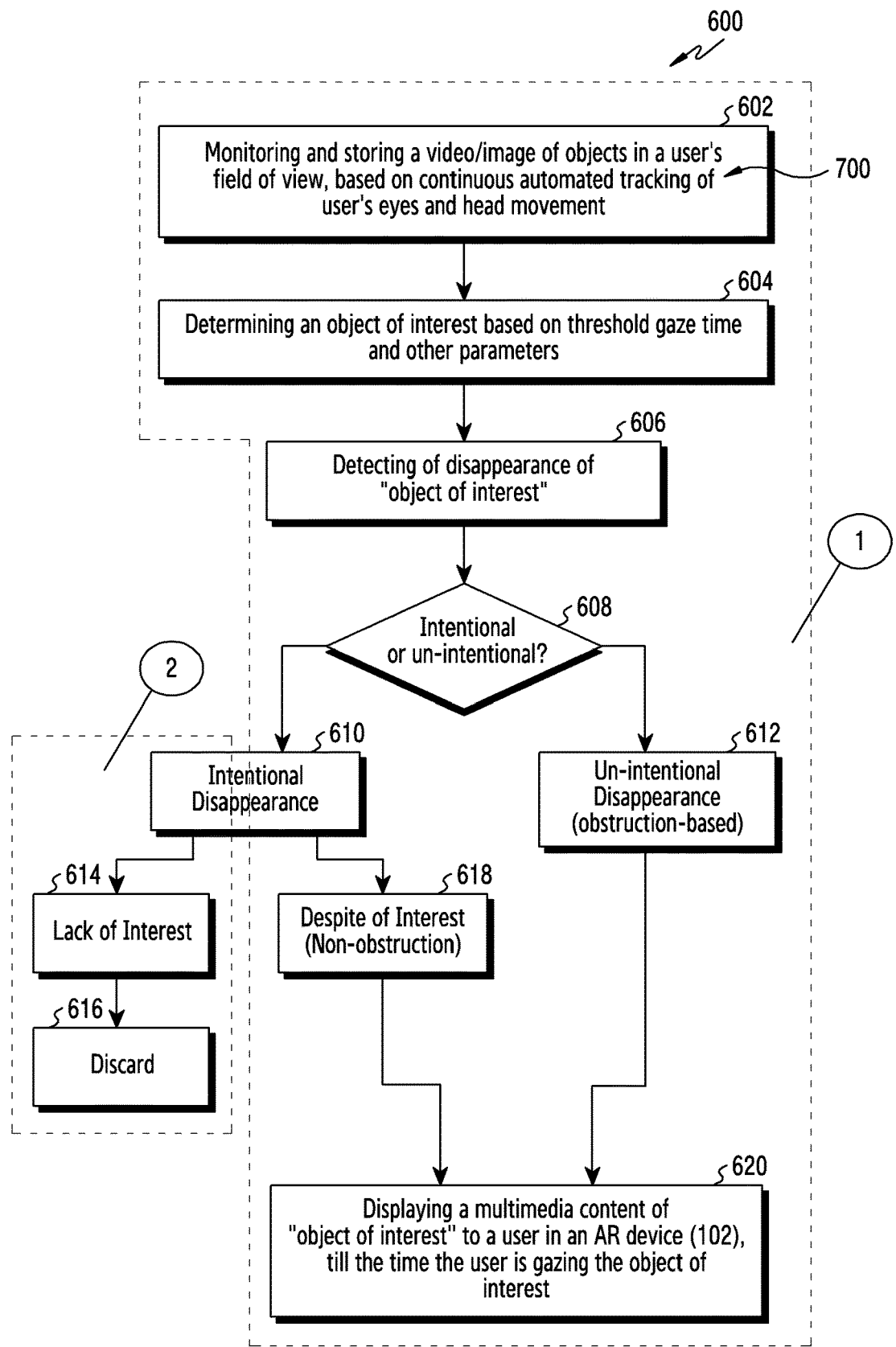
FIG. 6 illustrates a flow diagram depicting a process for displaying contents on an augmented reality (AR) device at the time when the user is gazing an object of interest, according to an exemplary embodiment of the disclosure.

FIG. 6 illustrates a flow diagram 600 depicting a process for displaying contents on an AR device at the time when the user is gazing at an object of interest, according to an exemplary embodiment of the disclosure.

The flow diagram 600 starts from step 602 of monitoring and storing a video/image of objects in a user's field of view, based on continuous automated tracking of the user's eyes and movement. In an embodiment, the capturing module 206 is configured to capture a video/image of a plurality of objects in the user's field of view, and the recording module 208 is configured to record, monitor, and store the video/image of objects in the user's field of view. The user input controller 210 is configured to track the user's eyes and movement.

At step 604, the process comprises determining an object of interest based on a threshold gaze time and other parameters. In an embodiment, the determination module 224 is configured to determine an object of interest based on a threshold gaze time and other parameters.

At step 606, the process comprises detecting of disappearance of "object of interest". In an embodiment, the identifier 226 is configured to detect the disappearance of the object of interest.

At step 608, the process comprises checking whether the disappearance of the object is intentional or un-intentional. In an embodiment, the identifier 226 is configured to identify whether the disappearance of the object is intentional or un-intentional. If the disappearance of the object of interest is intentional as shown in step 610, then the intentional disappearance is also identified by two conditions, i.e. lack of user's interest as shown in step 614, or despite of interest as shown in step 618. In an embodiment, the despite of interest is based on non-obstruction. If the intentional disappearance is due to lack of the user's interest, the system 100 discards the object of interest from further processing (616), and the user will not get disturbed unnecessarily at point 2. If the disappearance of the object of interest is based on despite of interest as shown in step 618, the system displays a multimedia content of "object of interest" to the user in the AR device 102 till the time the user is gazing at the object of interest as shown in step 620. In an embodiment, a display module 218 is configured to display a multimedia content of "object of interest" to the user in the AR device 102 till the time the user is gazing at the object of interest.

If the disappearance of the object of interest is un-intentional as shown in step 612, the system displays a multimedia content of "object of interest" to the user in the AR device 102 till the time the user is gazing at the object of interest, as shown in step 620. In an embodiment, the display module 218 is configured to display a multimedia content of "object of interest" to the user in the AR device 102 till the time the user is gazing at the object of interest. In an embodiment, the system 100 provides assistive display when the user requires it for interesting object viewing till the time the user is interested in viewing it at point 1.

Figure 7:
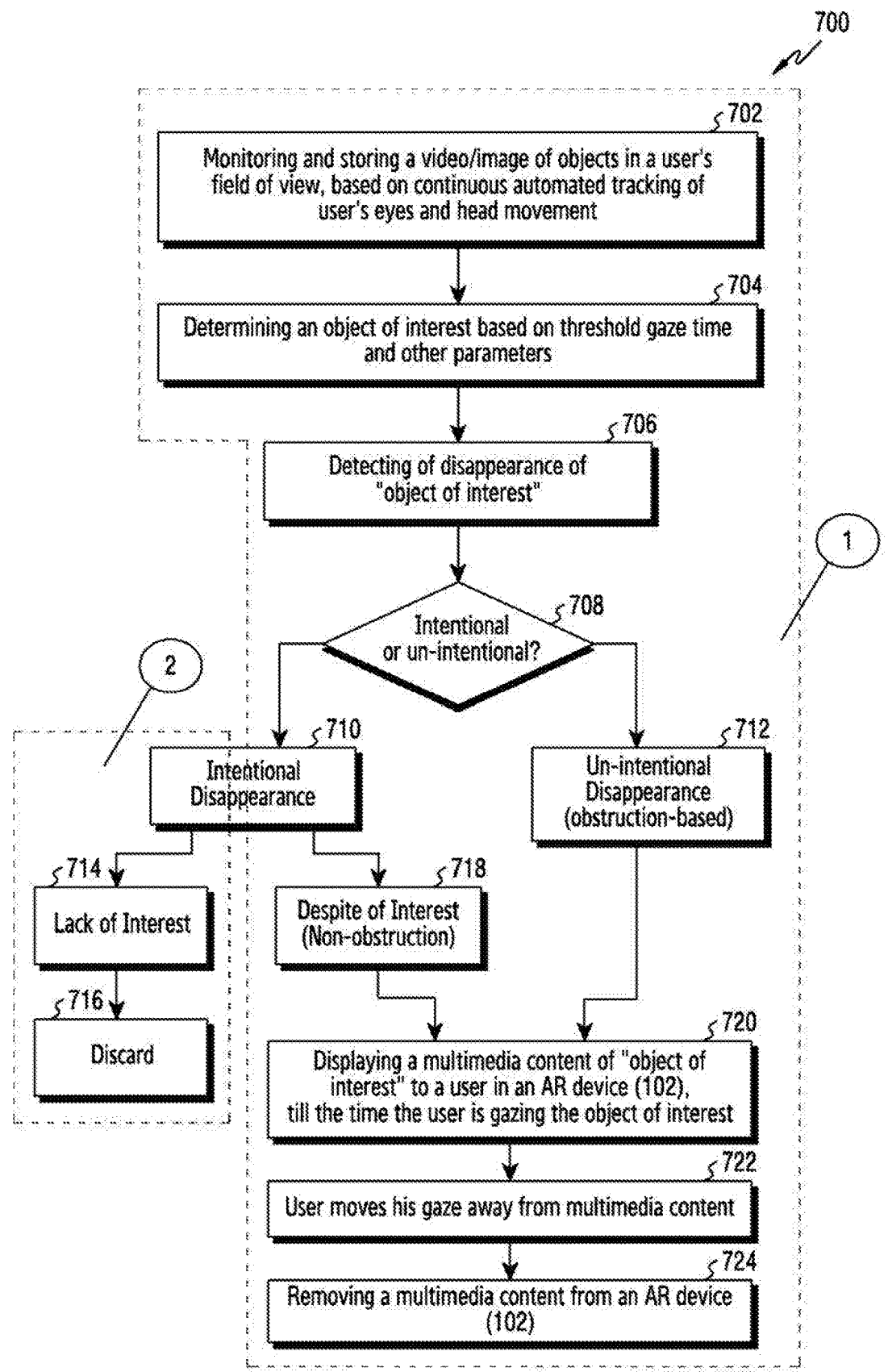
FIG. 7 illustrates a flow diagram depicting a process for removing a multimedia content from an AR device when the user moves his gaze away from the multimedia content, according to an exemplary embodiment of the disclosure.

FIG. 7 illustrates a flow diagram 700 depicting a process for removing a multimedia content from an AR device when the user moves his gaze away from the multimedia content, according to an exemplary embodiment of the disclosure.

The flow diagram 700 starts from step 702 of monitoring and storing a video/image of objects in a user's field of view, based on continuous automated tracking of the user's eyes and movement. In an embodiment, the capturing module 206 is configured to capture a video/image of a plurality of objects in the user's field of view, and the recording module 208 is configured to record, monitor, and store the video/image of objects in a user's field of view. The user input controller 210 is configured to track the user's eyes and movement.

At step 704, the process comprises determining an object of interest based on a threshold gaze time and other parameters. In an embodiment, the determination module 224 is configured to determine an object of interest based on a threshold gaze time and other parameters.

At step 706, the process comprises detecting of disappearance of "object of interest". In an embodiment, the identifier 226 is configured to detect the disappearance of the object of interest.

At step 708, the process comprises checking whether the disappearance of the object is intentional or un-intentional. In an embodiment, the identifier 226 is configured to identify whether the disappearance of the object is intentional or un-intentional. If the disappearance of the object of interest is intentional as shown in step 710, then the intentional disappearance is also identified by two conditions, i.e. lack of user's interest as shown in a step 714, or despite of interest as shown in step 718. In an embodiment, the despite of interest is based on non-obstruction. If the intentional disappearance is due to lack of the user's interest, the system 100 discards the object of interest from further processing 716, and the user will not get disturbed unnecessarily at point 2. If the disappearance of the object of interest is based on despite of interest as shown in step 712, the system displays a multimedia content of "object of interest" to the user in the AR device 102 till the time the user is gazing at the object of interest, as shown in step 720. In an embodiment, the display module 218 is configured to display a multimedia content of "object of interest" to the user in the AR device 102, till the time the user is gazing at the object of interest.

If the disappearance of the object of interest is un-intentional as shown in a step 712, displaying a multimedia content of "object of interest" to the user in the AR device 102, till the time the user is gazing the object of interest, as shown in step 720. In an embodiment, a display module 218 is configured to display a multimedia content of "object of interest" to the user in the AR device 102, till the time the user is gazing the object of interest. In an embodiment, the system 100 provides assistive display till the time the user is interested in viewing it which disappears quickly at point 1.

At step 722, the user moves his gaze away from multimedia content displayed on the AR device 102.

At step 724, the process comprises removing the multimedia content from an AR device 102. In an embodiment, the system 100 automatically removes the multimedia content if the user moves his gaze away from the multimedia content.

Figure 8:
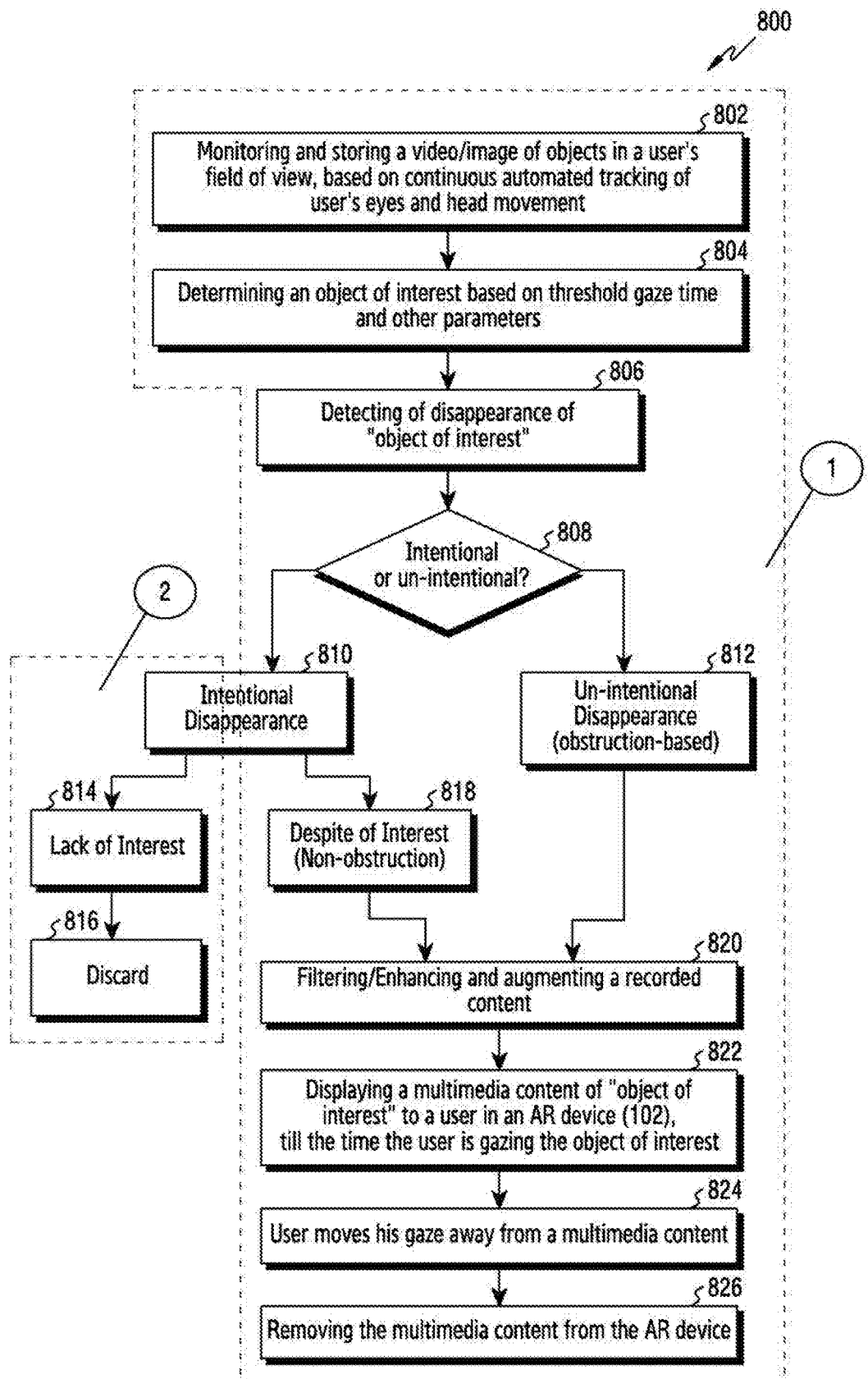
FIG. 8 illustrates a flow diagram depicting a process for filtering/enhancing and augmenting a recorded content, and showing the content to a user, and removing a multimedia content from an AR device when the user moves his gaze away from the multimedia content, according to an exemplary embodiment of the disclosure.

FIG. 8 illustrates a flow diagram 800 depicting a process for filtering/enhancing and augmenting a recorded content, and showing the content to a user, and removing a multimedia content from an AR device when the user moves his gaze away from the multimedia content, according to an exemplary embodiment of the disclosure.

The flow diagram 800 starts from step 802 of monitoring and storing a video/image of objects in a user's field of view, based on continuous automated tracking of the user's eyes and movement. In an embodiment, the capturing module 206 is configured to capture a video/image of a plurality of objects in the user's field of view, and the recording module 208 is configured to record, monitor, and store the video/image of objects in a user's field of view. The user input controller 210 is configured to track the user's eyes and movement.

At step 804, the process comprises determining an object of interest based on a threshold gaze time and other parameters. In an embodiment, the determination module 224 is configured to determine an object of interest based on a threshold gaze time and other parameters.

At step 806, the process comprises detecting of disappearance of "object of interest". In an embodiment, the identifier 226 is configured to detect the disappearance of the object of interest.

At step 808, the process comprises checking whether the disappearance of the object is intentional or un-intentional. In an embodiment, the identifier 226 is configured to identify whether the disappearance of the object is intentional or un-intentional. If the disappearance of the object of interest is intentional as shown in step 810, then the intentional disappearance is also identified by two conditions, i.e. lack of user's interest as shown in step 814, or despite of interest as shown in step 818. In an embodiment, the despite of interest is based on non-obstruction. If the intentional disappearance is due to lack of user's interest, the system 100 discards the object of interest from further processing 816, and the user will not get disturbed unnecessarily at point 2. If the disappearance of the object of interest is based on despite of interest as shown in step 818, then the system 100 generates the assistive content by filtering/enhancing and augmenting a recorded content at step 820. In an embodiment, the display module 218 is configured to display a content of the object of interest comprises a segment of the object of interest, or a modified version of the object of interest on the AR device 102. The modified version of the object of interest is generated by filtering and enhancement of the segment of the object of interest. The filtering and enhancement of the segment of the object of interest comprises filtering and enhancing an image, a video, augmented information related to the object of interest, and the combinations thereof.

At step 822, the process comprises displaying a multimedia content of "object of interest" to the user in the AR device 102 till the time the user is gazing at the object of interest. In an embodiment, the display module 218 is configured to display a multimedia content of "object of interest" to the user in the AR device 102 till the time the user is gazing at the object of interest.

If the disappearance of the object of interest is un-intentional as shown in a step 812, then the system 100 generates the assistive content by filtering/enhancing and augmenting a recorded content at step 820. In an embodiment, the display module 218 is configured to display a content of the object of interest comprises a segment of the object of interest, or a modified version of the object of interest on the AR device 102. The modified version of the object of interest is generated by filtering and enhancement of the segment of the object of interest. The filtering and enhancement of the segment of the object of interest comprises filtering an enhancing an image, a video, augmented information related to the object of interest, and the combinations thereof. In an embodiment, the system 100 provides assistive display till the time the user is interested in viewing it which disappears quickly at point 1.

At step 824, the user moves his gaze away from multimedia content displayed on the AR device 102.

At step 826, the process comprises removing the multimedia content from an AR device 102. In an embodiment, the system 100 automatically removes the multimedia content, if the user moves his gaze away from the multimedia content.

Figure 9:
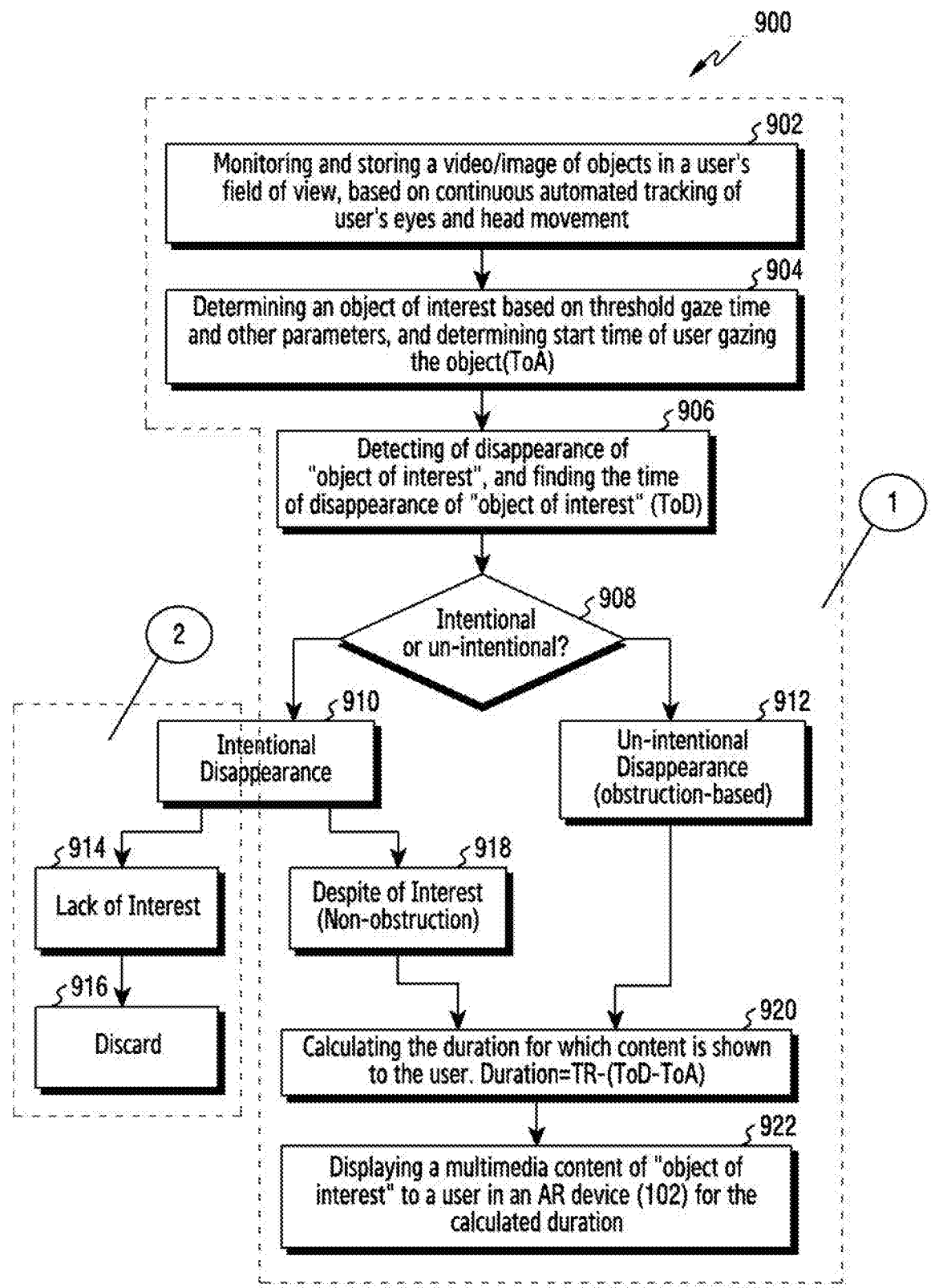
FIG. 9 illustrates a flow diagram depicting a process for displaying a multimedia content of an object of interest to a user in an AR device for a calculated duration, according to an exemplary embodiment of the disclosure.

FIG. 9 illustrates a flow diagram 900 depicting a process for displaying a multimedia content of an object of interest to a user in an AR device for a calculated duration, according to an exemplary embodiment of the disclosure. The process starts from step 902 of monitoring and storing a video/image of objects in a user's field of view, based on continuous automated tracking of the user's eyes and movement. In an embodiment, the capturing module 206 is configured to capture a video/image of a plurality of objects in the user's field of view, and the recording module 208 is configured to record, monitor, and store the video/image of objects in a user's field of view. The user input controller 210 is configured to track the user's eyes and movement.

At step 904, the process comprises determining an object of interest based on a threshold gaze time and other parameters. In an embodiment, the determination module 224 is configured to determine an object of interest based on a threshold gaze time and other parameters.

At step 906, the process comprises detecting of disappearance of "object of interest". In an embodiment, the identifier 226 is configured to detect the disappearance of the object of interest.

At step 908, the process comprises checking whether the disappearance of the object is intentional or un-intentional. In an embodiment, the identifier 226 is configured to identify whether the disappearance of the object is intentional or un-intentional. If the disappearance of the object of interest is intentional as shown in step 910, then the intentional disappearance is also identified by two conditions, i.e. lack of user's interest as shown in step 914, or despite of interest as shown in step 918. In an embodiment, the despite of interest is based on non-obstruction. If the intentional disappearance is due to lack of user's interest, the system 100 discards the object of interest from further processing 916, and the user will not get disturbed unnecessarily at point 2.

If the disappearance of the object of interest is based on despite of interest as shown in step 912, the system 100 determines the content complexity of an "object of interest", and calculates time required (TR) by the user to read/view the object of interest. In an embodiment, the complexity identifier 236 is configured to determine the content complexity of an "object of interest", and calculate time required (TR) by the user to read/view the object of interest.

At step 920, the process comprises calculating the duration for which content is shown to the user by using a formula:

$$Duration=TR-(ToD-ToA)$$

In an embodiment, the complexity identifier 236 is configured to calculate the duration for which content is shown to the user.

At step 922, the process comprises displaying a multimedia content of "object of interest" to the user in the AR device 102 for the calculated duration, as shown in step 922. In an embodiment, the display module 218 is configured to display a multimedia content of "object of interest" to the user in the AR device 102 for the calculated duration.

If the disappearance of the object of interest is un-intentional as shown in step 912, the system 100 determines the content complexity of an "object of interest", and calculates time required (TR) by the user to complexity read/view the object of interest. In an embodiment, the complexity identifier 236 is configured to determine the content complexity of an "object of interest", and calculate time required (TR) by the user to complexity react/view the object of interest. In an embodiment, the system 100 provides assistive display when the user requires it for interesting object viewing till the time the user is interested in viewing it at point 1.

Figure 10:
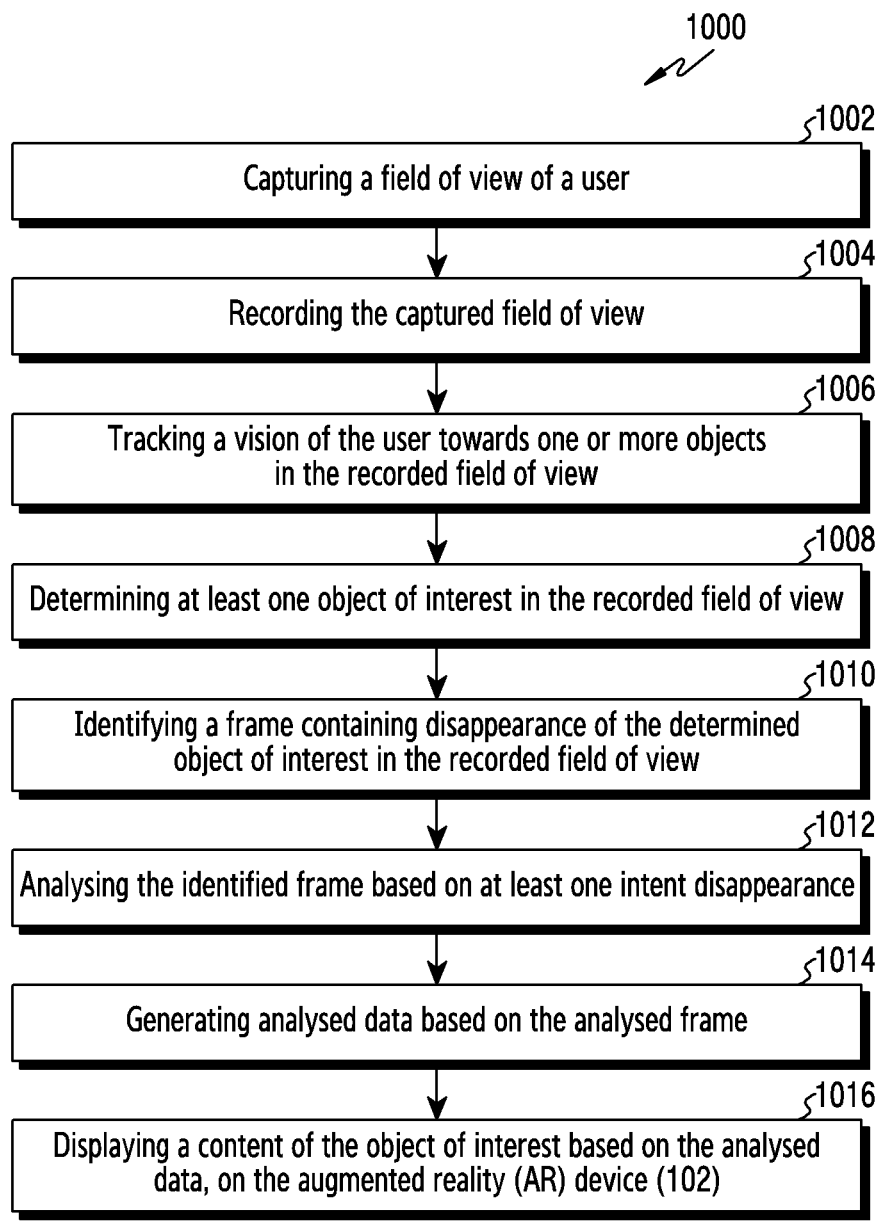
FIG. 10 illustrates a flowchart depicting a process for displaying contents on an augmented reality (AR) device, according to an exemplary embodiment of the disclosure.

FIG. 10 illustrates a flowchart 1000 depicting a process for displaying contents on an AR device, according to an exemplary embodiment of the disclosure.

The flowchart 1000 starts from step 1002 of capturing a field of view of a user. In an embodiment, the capturing module 206 is configured to capture a field of view of a user.

At step 1004, the process comprises recording the captured field of view. In an embodiment, the recording module 208 is configured to record the captured field of view.

At step 1006, the process comprises tracking a vision of the user towards one or more objects in the recorded field of view. In an embodiment, the user input controller 210 is configured to track a vision of the user towards one or more objects in the recorded field of view.

At step 1008, the process comprises determining at least one object of interest in the recorded field of view. In an embodiment, the determination module 224 is configured to determine at least one object of interest in the recorded field of view.

At step 1010, the process comprises identifying a frame containing disappearance of the determined object of interest in the recorded field of view. In an embodiment, the identifier 226 is configured to identify a frame containing disappearance of the determined object of interest in the recorded field of view.

At step 1012, the process comprises analysing the identified frame based on at least one intent disappearance. In an embodiment, the analyser 230 is configured to analyse the identified frame based on at least one intent disappearance.

At step 1014, the process comprises generating analysed data based on the analysed frame. In an embodiment, the analyser 230 is configured to generate analysed data based on the analysed frame.

At step 1016, the process comprises displaying a content of the object of interest based on the analysed data, on the AR device 102. In an embodiment, the display module 218 is configured to display a content of the object of interest based on the analysed data, on the AR device 102.

Figure 11:
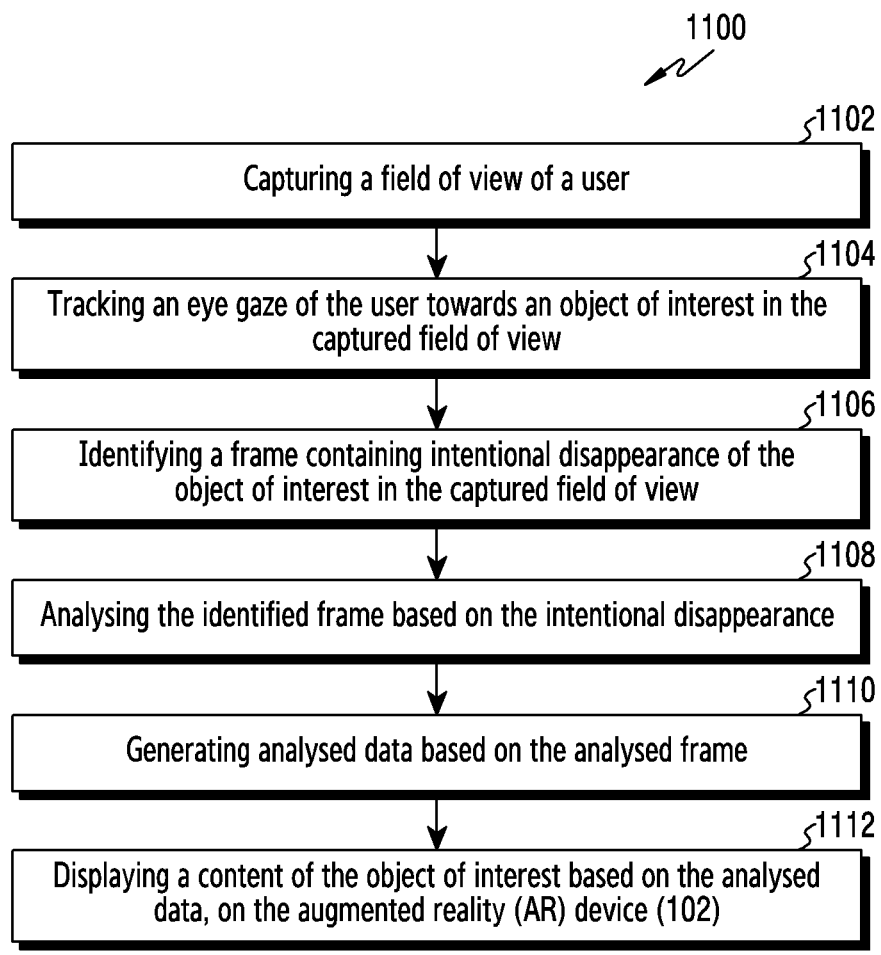
FIG. 11 illustrates a flowchart depicting a process for displaying contents on an augmented reality (AR) device in case of intentional disappearance, according to an exemplary embodiment of the disclosure.

FIG. 11 illustrates a flowchart 1100 depicting a process for displaying contents on an AR device in case of intentional disappearance, according to an exemplary embodiment of the disclosure.

The flowchart 1100 starts from step 1102 of capturing a field of view of a user. In an embodiment, the capturing module 206 is configured to capture a field of view of a user.

At step 1104, the process comprises tracking an eye gaze of the user towards an object of interest in the captured field of view. In an embodiment, the user input controller 210 is configured to track an eye gaze of the user towards an object of interest in the captured field of view.

At step 1106, the process comprises identifying a frame containing intentional disappearance of the object of interest in the captured field of view. In an embodiment, the identifier 226 is configured to identify a frame containing intentional disappearance of the object of interest in the captured field of view.

At step 1108, the process comprises analysing the identified frame based on intentional disappearance. In an embodiment, an analyser 230 is configured to analyse the identified frame based on an intentional disappearance.

At step 1110, the process comprises generating analysed data based on the analysed frame. In an embodiment, the analyser 230 is configured to generate analysed data based on the analysed frame.

At step 1112, the process comprises displaying a content of the object of interest based on the analysed data, on the AR device 102. In an embodiment, the display module 218 is configured to display a content of the object of interest based on the analysed data, on the AR device 102.

Figure 12:
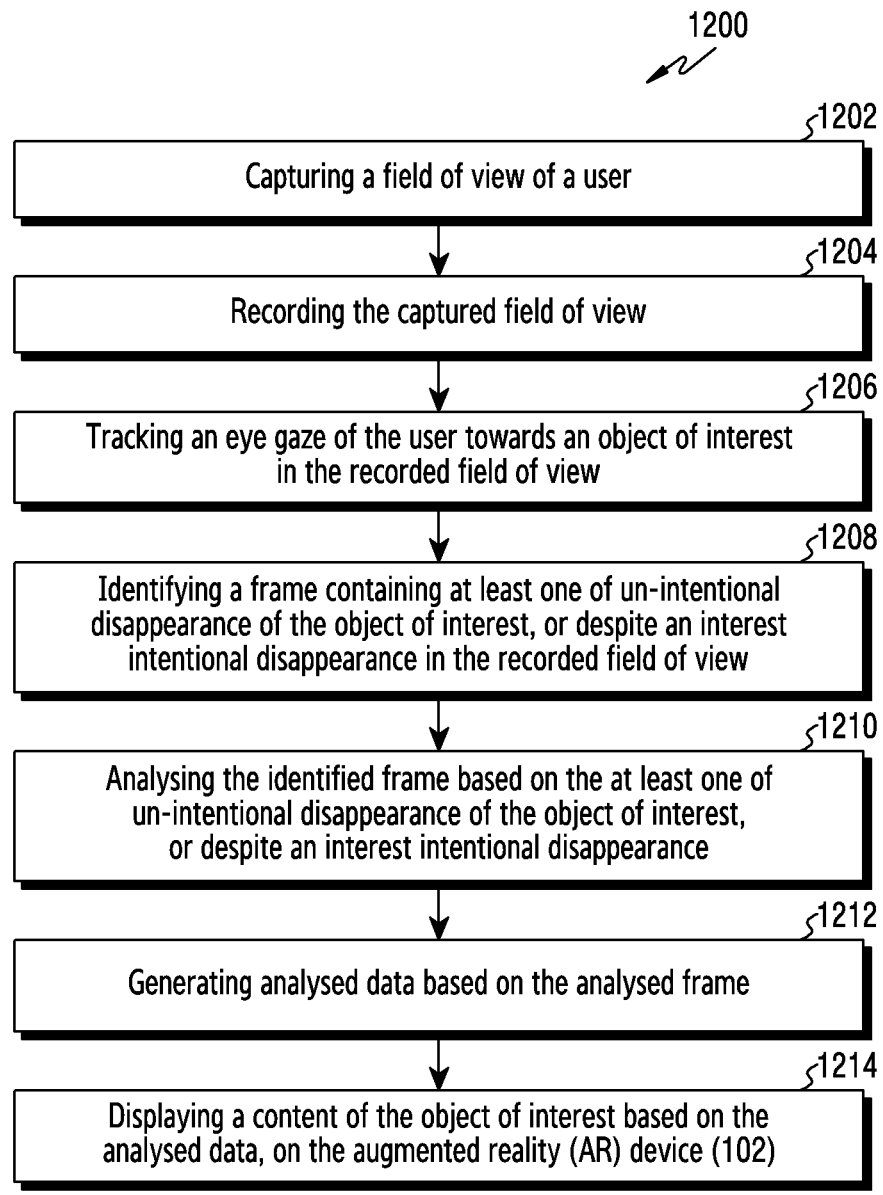
FIG. 12 illustrates a flowchart depicting a process for displaying contents on an augmented reality (AR) device in case of un-intentional disappearance of the object of interest, or intentional disappearance of the object of interest despite the interest, according to an exemplary embodiment of the disclosure.

FIG. 12 illustrates a flowchart 1200 depicting a process for displaying contents on an AR device in case of un-intentional disappearance of the object of interest, or despite an interest intentional disappearance, according to an exemplary embodiment of the disclosure.

The flowchart 1200 starts from step 1202 of capturing a field of view of a user. In an embodiment, the capturing module 206 is configured to capture a field of view of a user.

At step 1204, the process comprises recording the captured field of view. In an embodiment, a recording module 208 is configured to record the captured field of view.

At step 1206, the process comprises tracking an eye gaze of the user towards an object of interest in the recorded field of view. In an embodiment, the user input controller 210 is configured to track an eye gaze of the user towards an object of interest in the recorded field of view.

At step 1208, the process comprises identifying a frame containing at least one of un-intentional disappearance of the object of interest, or despite an interest intentional disappearance in the recorded field of view. In an embodiment, the identifier 226 is configured to identify a frame containing at least one of un-intentional disappearance of the object of interest, or despite an interest intentional disappearance in the recorded field of view.

At step 1210, the process comprises analysing the identified frame based on at least one of un-intentional disappearance of the object of interest, or despite an interest intentional disappearance. In an embodiment, the analyser 230 is configured to analyse the identified frame based on at least one of un-intentional disappearance of the object of interest, or despite an interest intentional disappearance.

At step 1212, the process comprises generating analysed data based on the analysed frame. In an embodiment, the analyser 230 is configured to generate analysed data based on the analysed frame.

At step 1214, the process comprises displaying a content of the object of interest based on the analysed data, on the AR device 102. In an embodiment, the display module 218 is configured to display a content of the object of interest based on the analysed data, on the AR device 102.

In various embodiments as described above, the AR device 102 displays a content of the object of interest in response to intentional or un-intentional disappearance of the object. In another embodiment, the AR device may display an indication (e.g., a pop-up window for an alarm or a reminder) before displaying the content of the object of interest. For example, the indication may comprises a message informing that the content of the object is recorded, at least one item (e.g., a button) for inputting a command to display the content.

In embodiments, the indication is displayed at the AR device 102 or another device. For example, the other device may be a wearable device such as a watch paired to the AR device 102. In this case, if a user touches the indication displayed on the other device, the AR device 102 displays the content of the object of interest on a display of the AR device 102.

In embodiments, the indication is displayed after a predefined time elapsed from a time when the object of interest disappeared. In this case, before the predefined time elapses, the AR device 102 may display the content of the object of interest during at least a part of a period between disappearance of the object and displaying the indication.

Figure 13:
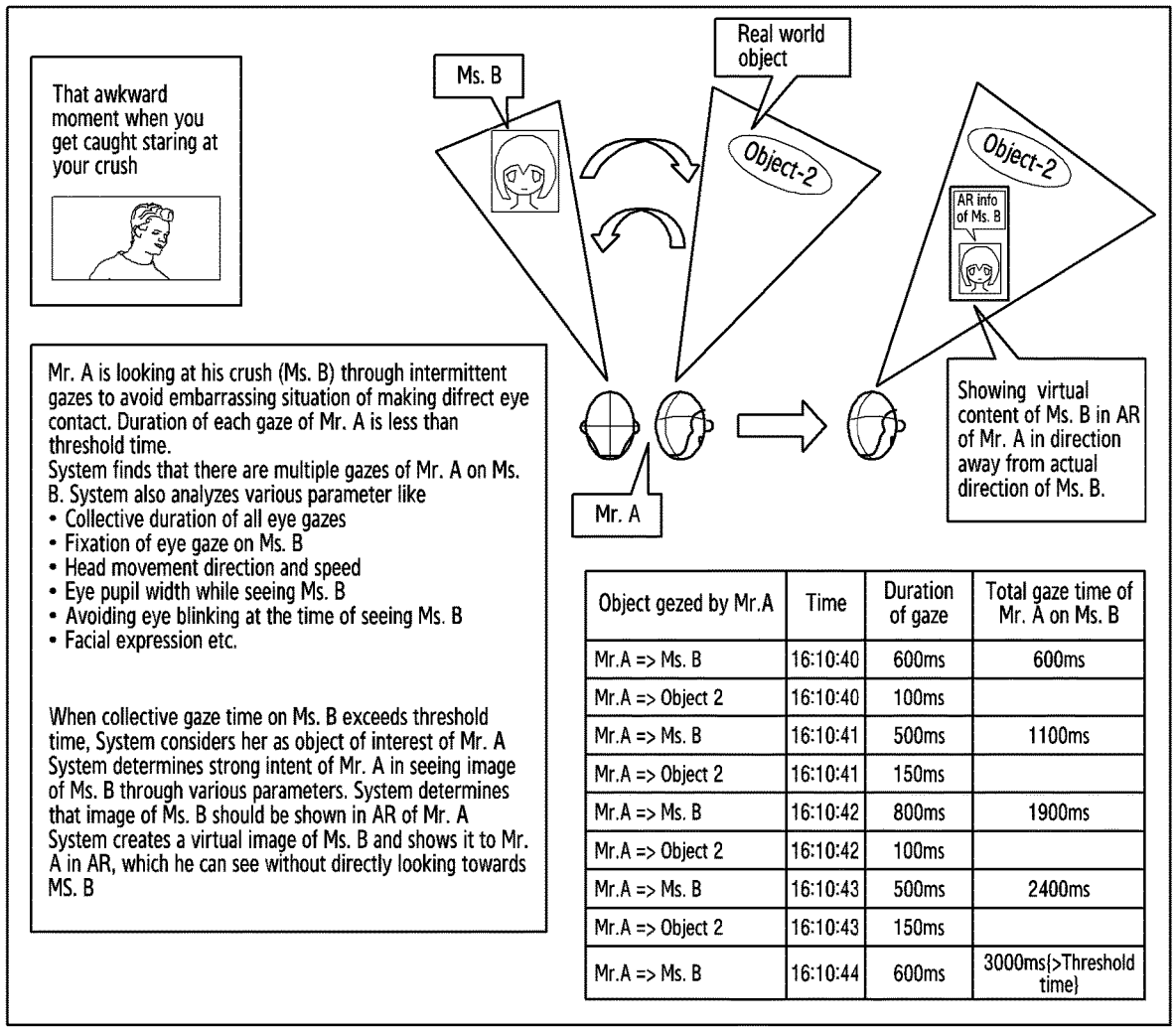
FIG. 13 illustrates a use-case scenario depicting intentional disappearance despite the interest of a user, according to an exemplary embodiment of the disclosure.

FIG. 13 illustrates a use-case scenario 1300 depicting intentional disappearance despite the interest of a user, according to an exemplary embodiment of the disclosure.

In FIG. 13, a user is watching his crush intermittently as he feels awkward with direct eye contact. In an exemplary embodiment, Mr. A is looking at his crush (Ms. B) through intermittent gazes to avoid embarrassing situation of making direct eye contact. Duration of each gaze of Mr. A is less than a threshold time. The system 100 finds that there are multiple gazes of Mr. A on Ms. B. The system 100 also analyzes various parameters like collective duration of all eye gazes, fixation of eye gaze on Ms. B, head movement direction and speed, eye pupil width while seeing Ms. B, avoiding eye blinking at the time of seeing Ms. B, facial expression etc. When a collective gaze time on Ms. B exceeds a threshold time, the system 100 considers her as object of interest of Mr. A. The system 100 determines strong intent of Mr. A in seeing an image of Ms. B through various parameters. The system 100 determines that an image of Ms. B should be shown in the AR device of Mr. A. The system 100 creates a virtual image of Ms. B and shows the virtual image to Mr. A in the AR device 102, which he can see without directly looking towards Ms. B. Table 2 represents total gaze time of Mr. A on Ms. B.

TABLE 2

| Object gazed by Mr. A | Time | Duration of gaze | Total gaze time of Mr. A on Ms. B |
|---|---|---|---|
| Mr. A => Ms. B | 16:10:40 | 600 ms | 600 ms |
| Mr. A => Object2 | 16:10:40 | 100 ms | |
| Mr. A => Ms. B | 16:10:41 | 500 ms | 1100 ms |
| Mr. A => Object2 | 16:10:41 | 150 ms | |
| Mr. A => Ms. B | 16:10:42 | 800 ms | 1900 ms |
| Mr. A => Object2 | 16:10:42 | 100 ms | |
| Mr. A => Ms. B | 16:10:43 | 500 ms | 2400 ms |
| Mr. A => Object2 | 16:10:43 | 150 ms | |
| Mr. A => Ms. B | 16:10:44 | 600 ms | 3000 ms (>Threshold time) |

Figure 14:
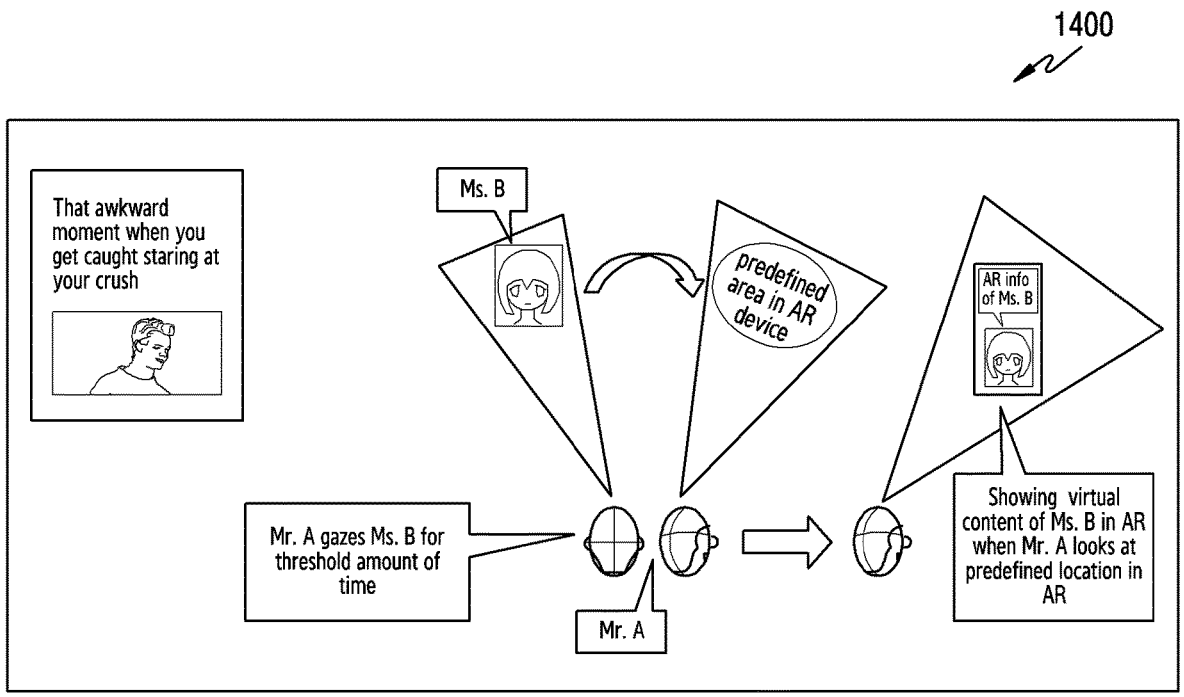
FIG. 14 illustrates a use-case scenario depicting intentional disappearance despite the interest of a user, according to an exemplary embodiment of the disclosure.

FIG. 14 illustrates a use-case scenario 1400 depicting intentional disappearance despite the interest of a user, according to an exemplary embodiment of the disclosure.

In FIG. 14, a user looks at pre-defined area in an AR device 102 to see his object of interest in the AR device 102 before disappearance of the object of interest. Mr. A wants to see his crush (Ms. B). But he does not want to make an eye contact with her. Mr. A gazes at Ms. B for a threshold amount of time. He removes his gaze from Ms. B and looks at a predefined location in the AR device 102. The system 100 determines it as a request to show the object of interest in the AR device 102. The system 100 prepares multimedia content from the face of Ms. B and displays the content in the AR device 102. Now, Mr. A can see Ms. B in the AR device 102 without looking at her directly.

Figure 15:
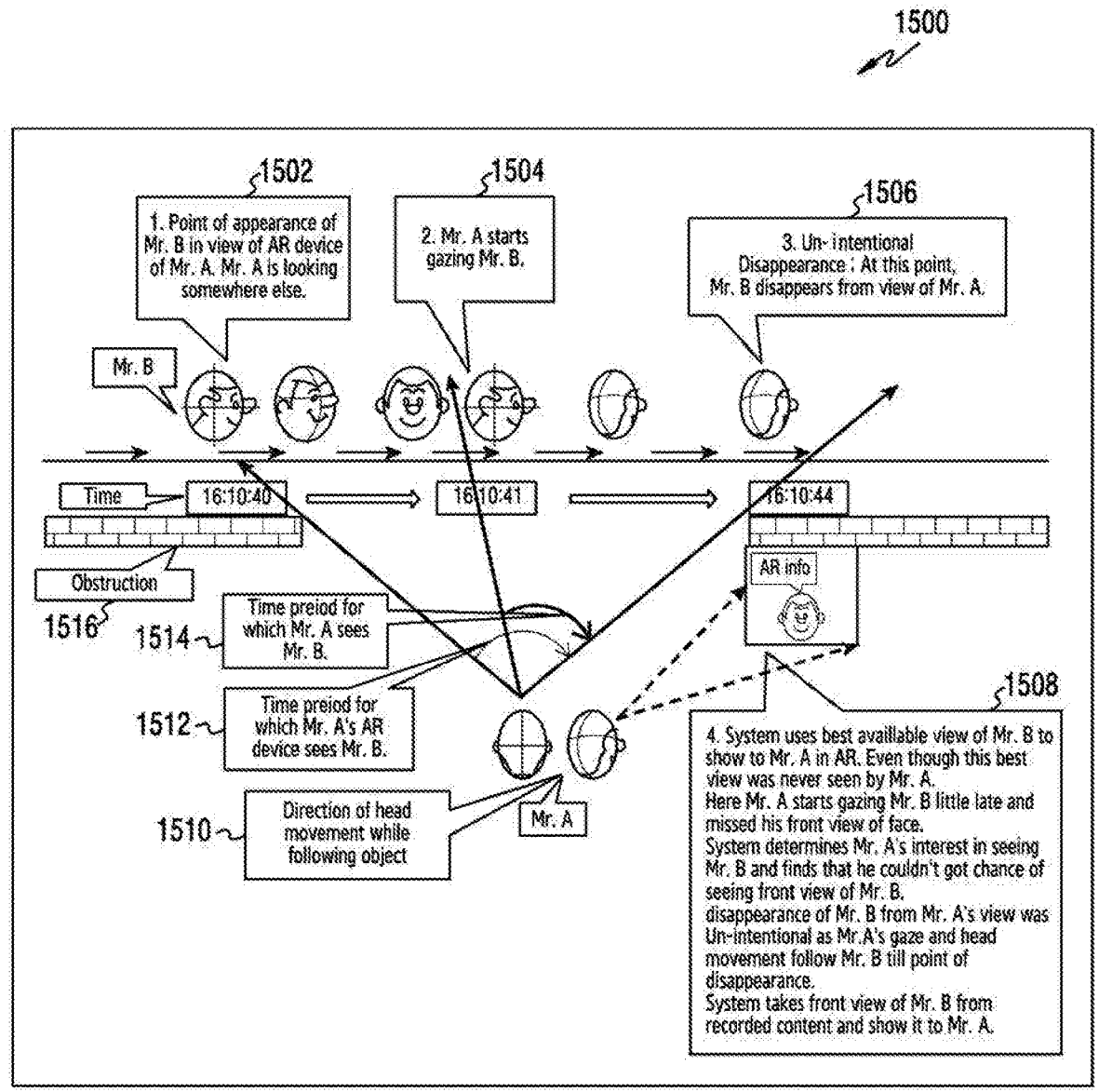
FIG. 15 illustrates a use-case scenario depicting un-intentional disappearance, according to an exemplary embodiment of the disclosure.

FIG. 15 illustrates a use-case scenario 1500 depicting un-intentional and obstructing disappearance, according to an exemplary embodiment of the disclosure.

In FIG. 15. Best available view of the object of interest is provided to the user. Here, the state of the object of interest changes, i.e. the object of interest turns his head and could not see it properly. At 1502, point of appearance of Mr. B in view of the AR device 102 of Mr. A. Mr. A is looking somewhere else. At 1504, Mr. A starts gazing at Mr. B. At 1506, Mr. B disappears from a view of Mr. A. This disappearance is known as an un-intentional disappearance. The system 100 uses best available view of Mr. B to show to Mr. A in AR even though this best view was never seen by Mr. A. At 1508, Mr. A starts gazing at Mr. B little late and missed his front view of face. The system 100 determines Mr. A's interest in seeing Mr. B and finds that Mr. A could not get chance of seeing front view of Mr. B. Disappearance of Mr. B from Mr. A's view was un-intentional as Mr. A's gaze and head movement follow Mr. B till point of disappearance. The system 100 takes a front view of Mr. B from recorded content and show it to Mr. A. The system 100 considers parameters such as direction of head movement while following the object 1510, a time period for which Mr. A's AR device sees Mr. B 1512, a time period for which Mr. A sees Mr. B 1514, and an obstruction 1516.

Figure 16A:
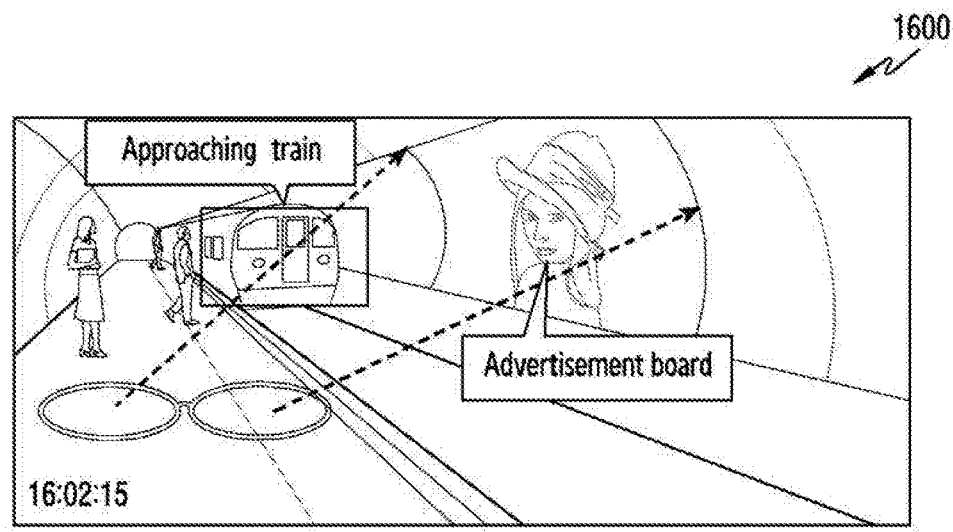
FIGS. 16A-16C illustrates a use-case scenario depicting un-intentional and obstructing disappearance, according to an exemplary embodiment of the disclosure.
Figure 16B:
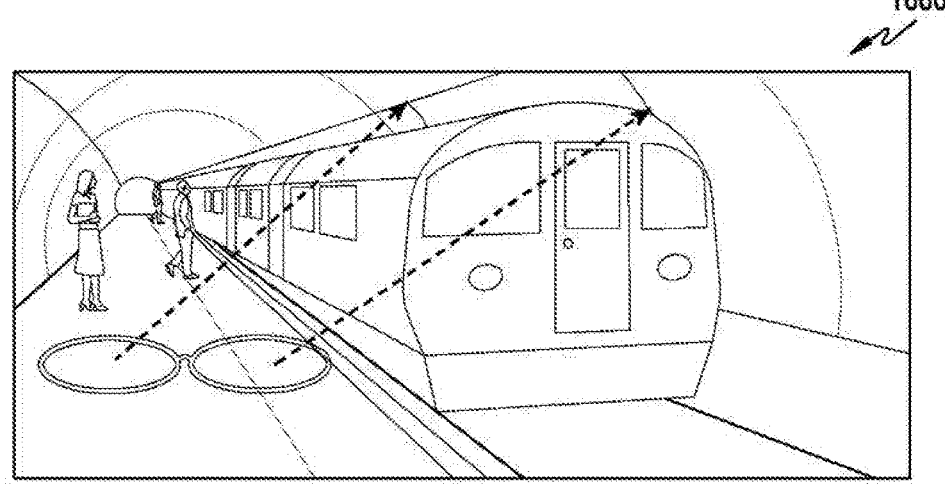
Figure 16C:
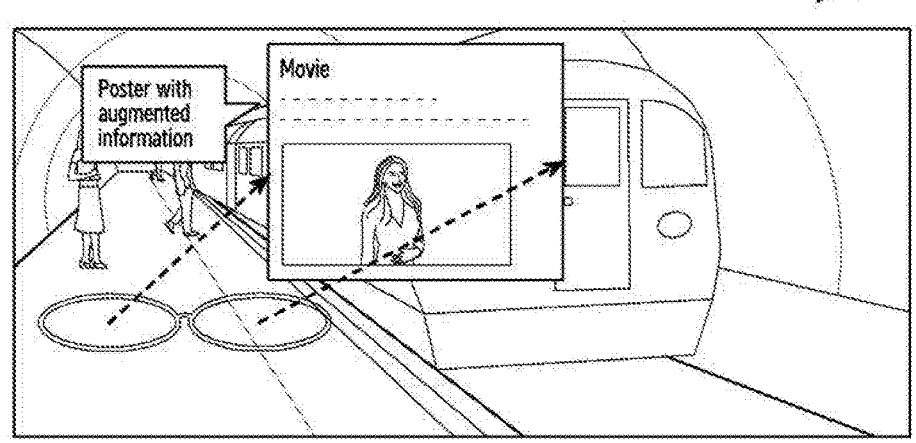

FIGS. 16A-16C illustrate a use-case scenario 1600 depicting an un-intentional disappearance of an object due to an obstruction between a user and the object, according to an exemplary embodiment of the disclosure.

In FIG. 16A, Mr. A has been reading an advertisement board for more than a threshold amount of time, on another side of a railway track. A train is approaching. In FIG. 16B, approaching train came in between Mr. A and the advertisement board while he was still reading the board. Mr. A could not read the board completely. In FIG. 16C, the system 100 determines that Mr. A is still interested in the board. The system 100 creates a virtual content and shows the virtual content in Mr. A's AR device.

Figure 17A:
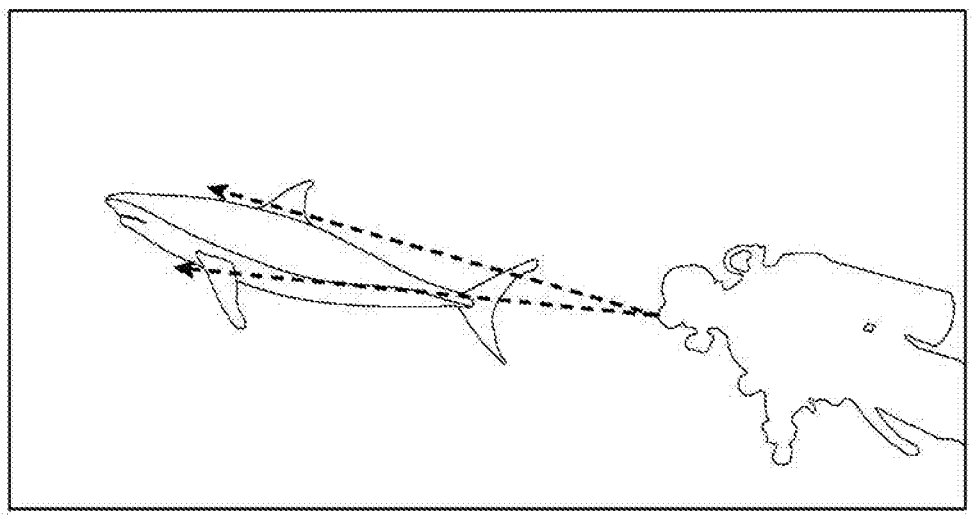
FIGS. 17A-17B illustrate a use-case scenario depicting an un-intentional disappearance of an object due to loss of visibility of an obstruction between a user and the object, according to an exemplary embodiment of the disclosure.
Figure 17B:
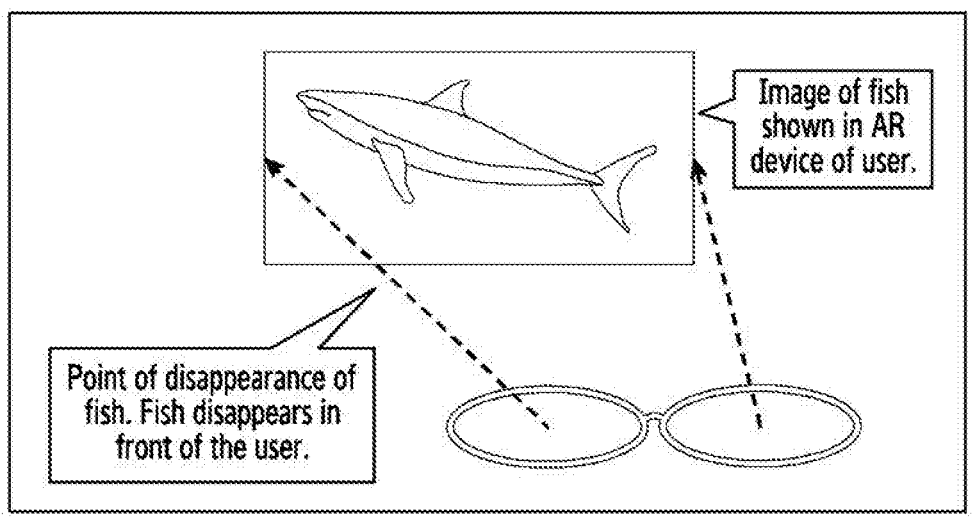

FIGS. 17A-17B illustrate a use-case scenario 1700 depicting an un-intentional disappearance of an object due to loss of visibility of an obstruction between a user and the object, according to an exemplary embodiment of the disclosure.

In FIG. 17A, a user is scuba-diving in ocean. He is watching at a fish for more than a threshold time. In FIG. 17B, suddenly fish starts swimming very fast and disappears in darkness of water, in front of the user. The system 100 displays an image of the fish in the AR device 102 of the user.

FIGS. 18A-18D illustrate a use-case scenario 1800 depicting an intentional disappearance despite the interest of user, according to an exemplary embodiment of the disclosure.

Figure 18A:
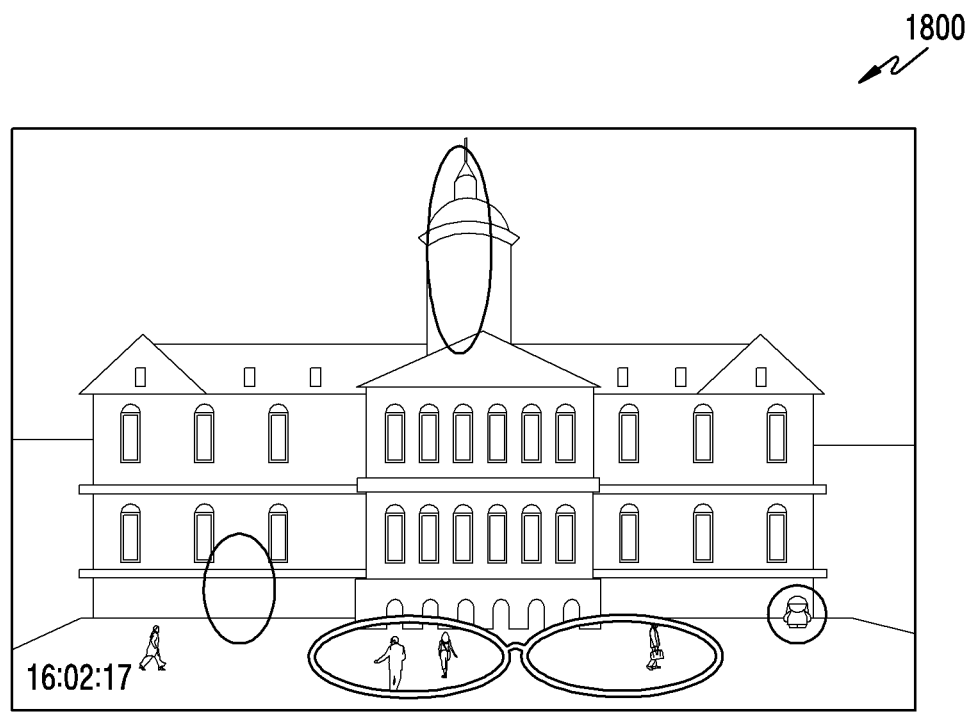
FIGS. 18A-18D illustrate a use-case scenario depicting an intentional disappearance despite the interest of a user, according to an exemplary embodiment of the disclosure.
Figure 18B:
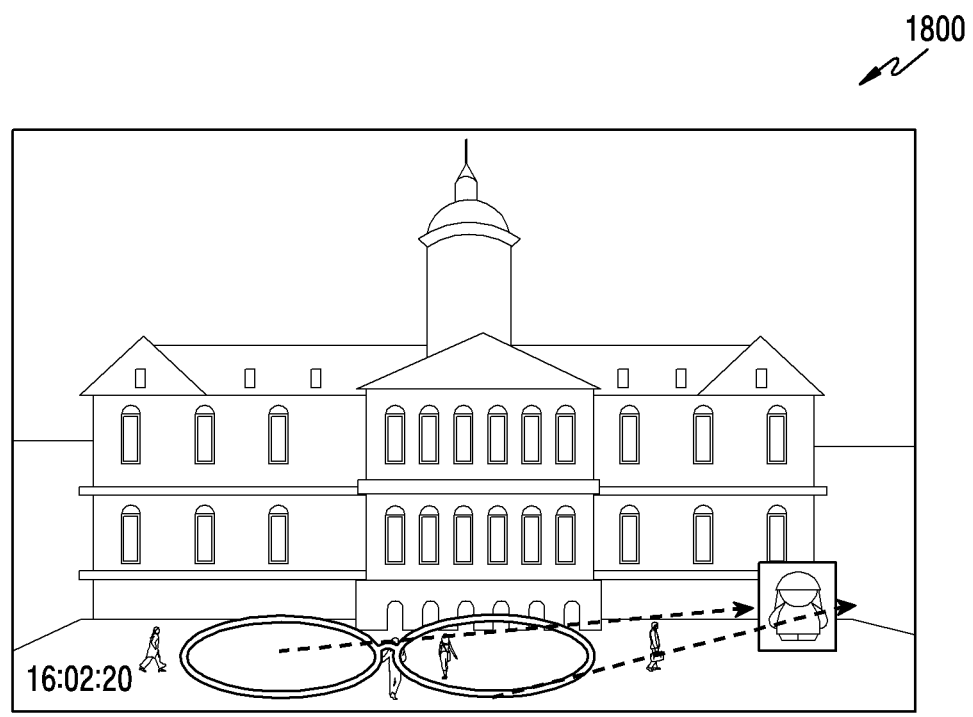
Figure 18C:
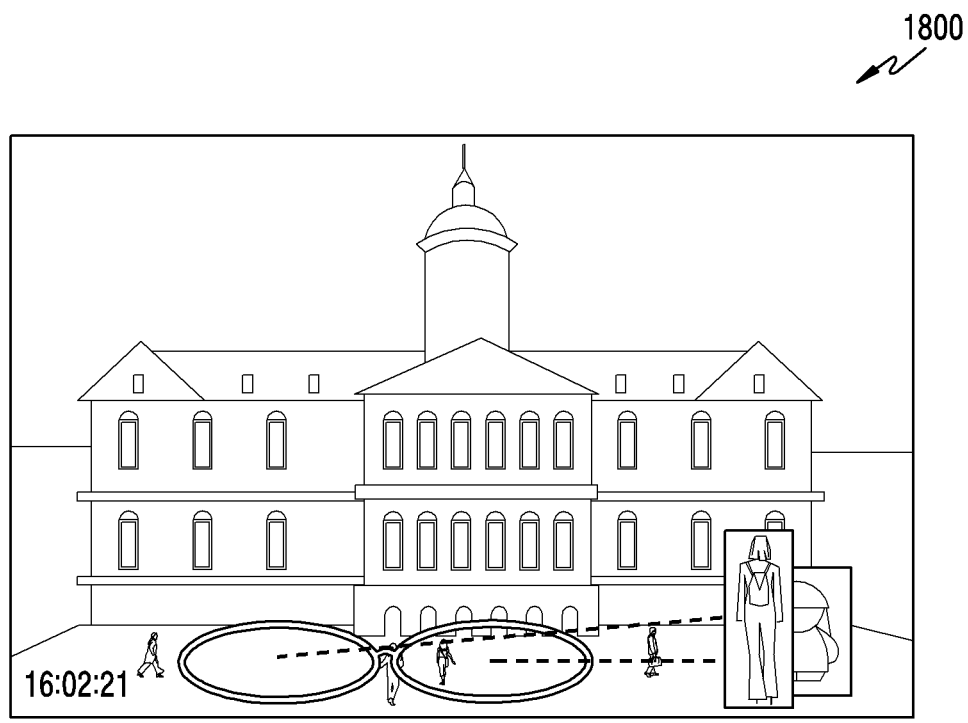
Figure 18D:
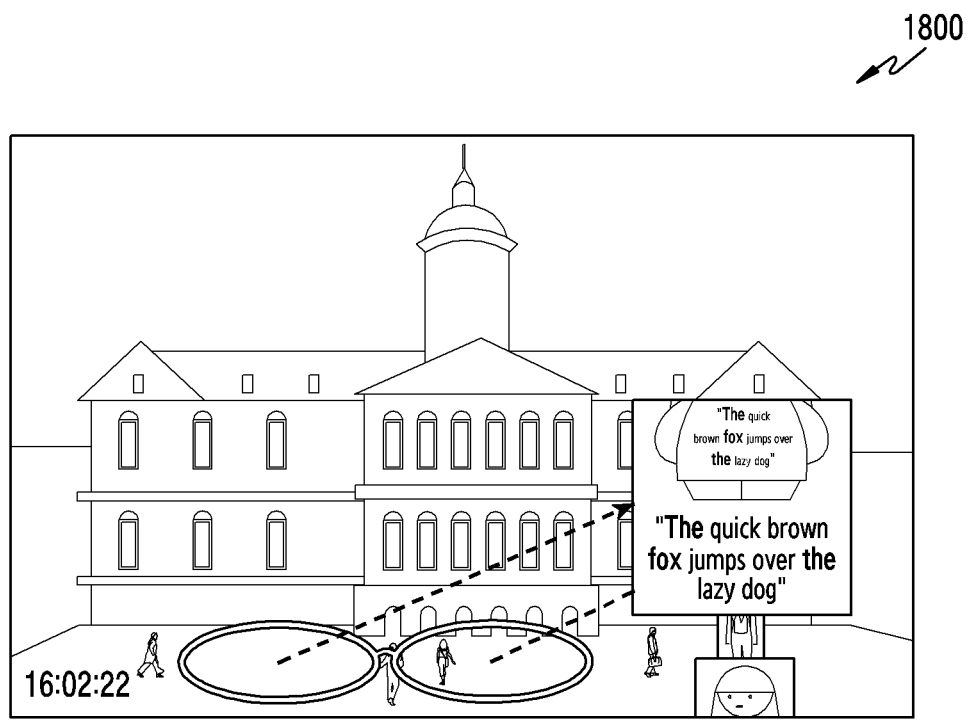

In FIG. 18A, a user is walking on a street looking at various objects coming on his way. Another person wearing a slogan T-Shirt enters user's field of vision. In FIG. 18B, the user sees slogan on the t-shirt of a lady coming from opposite direction. The user wants to read the slogan but feels embarrassed to continuously gaze at the t-shirt. So, the user watches t-shirt with intermittent gazes. These intermittent gazes continue for more than a threshold time. In FIG. 18C, the user is unable to read slogan on the t-shirt completely due to angle of viewing, obstacle in between and complexity of content. The user keeps moving his head and eye towards slogan, with intermittent gazes. In FIG. 18D, the lady walks past the user. Now slogan is out of the user's view. The system 100 recreates best possible image of slogan along with additional information. This image is shown in the AR device 102. Now, the user can read the slogan in his AR device 102 without any embarrassment.

FIGS. 19A-19F illustrate a use-case scenario 1900 depicting an intentional disappearance despite the interest, due to relative motion between a user and an object, according to an exemplary embodiment of the disclosure.

Figure 19A:
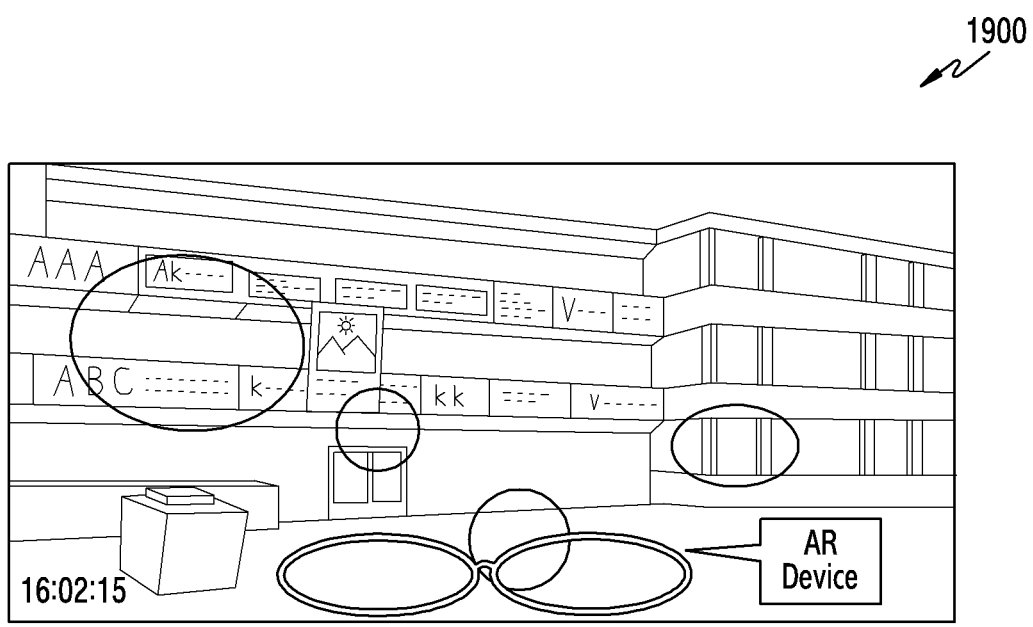
FIGS. 19A-19F illustrate a use-case scenario depicting an intentional disappearance despite the interest of user, according to an exemplary embodiment of the disclosure.
Figure 19B:
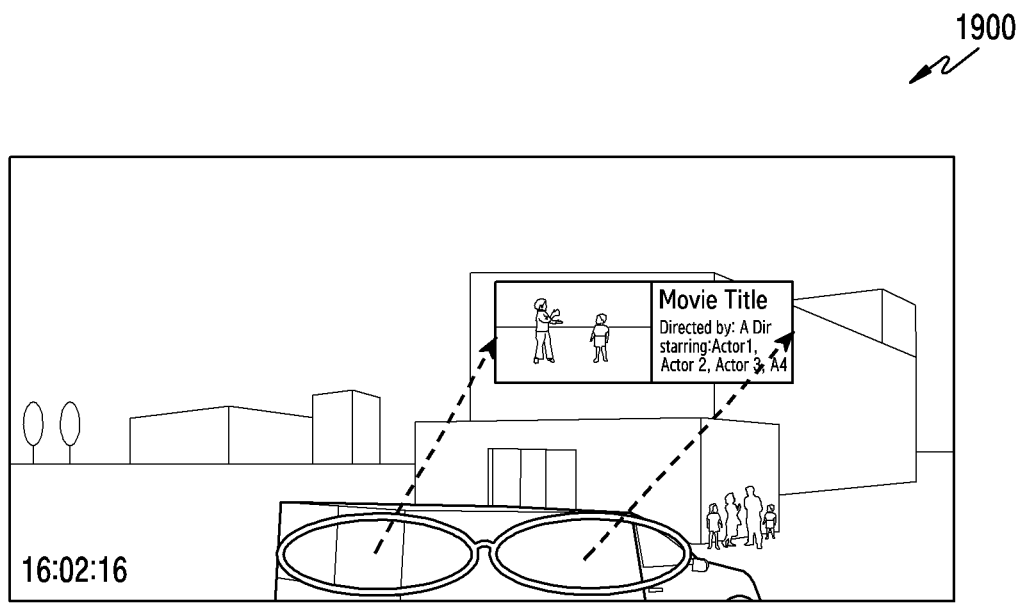
Figure 19C:
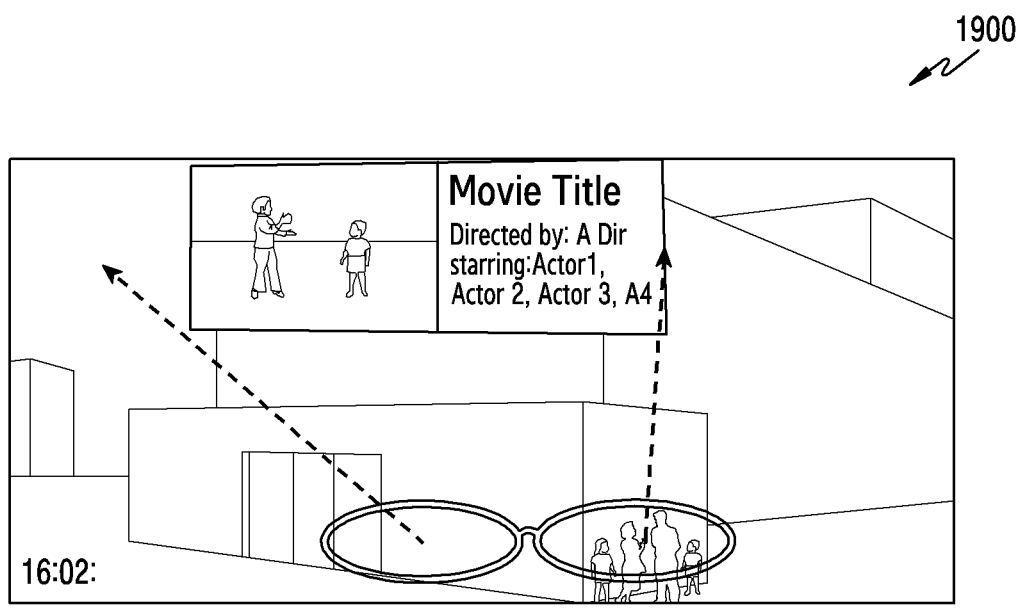
Figure 19D:
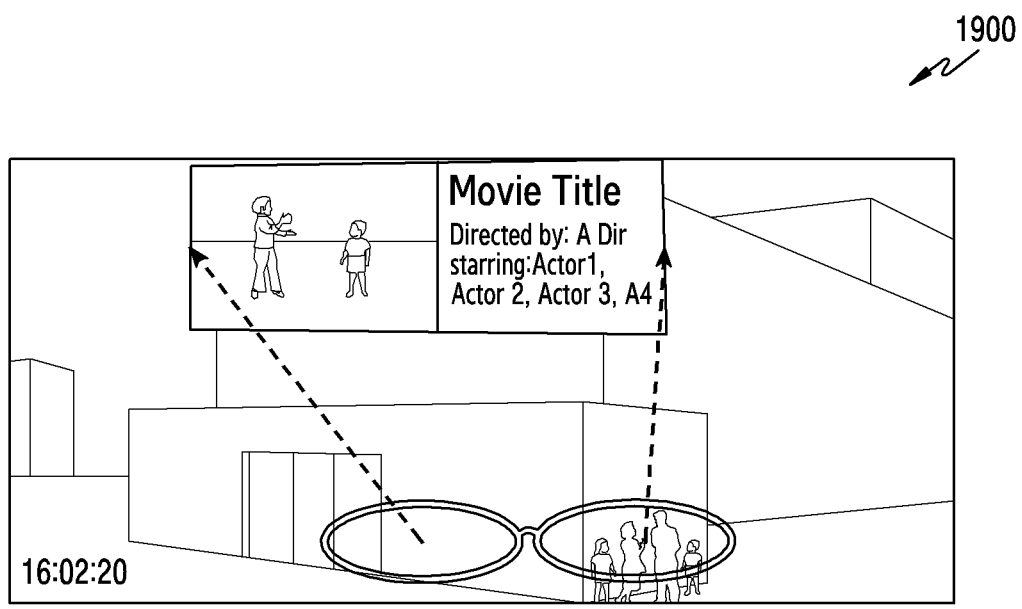
Figure 19E:
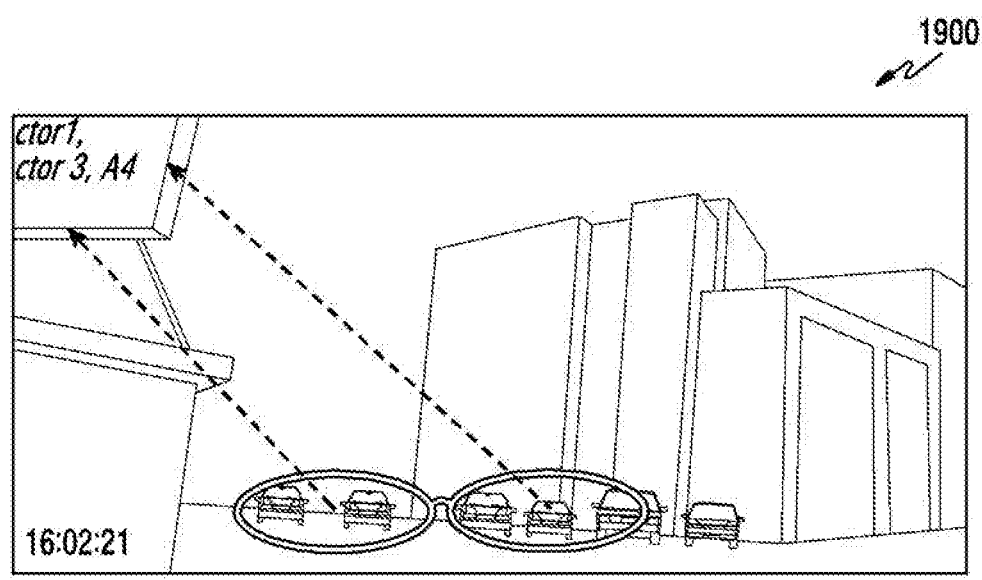
Figure 19F:
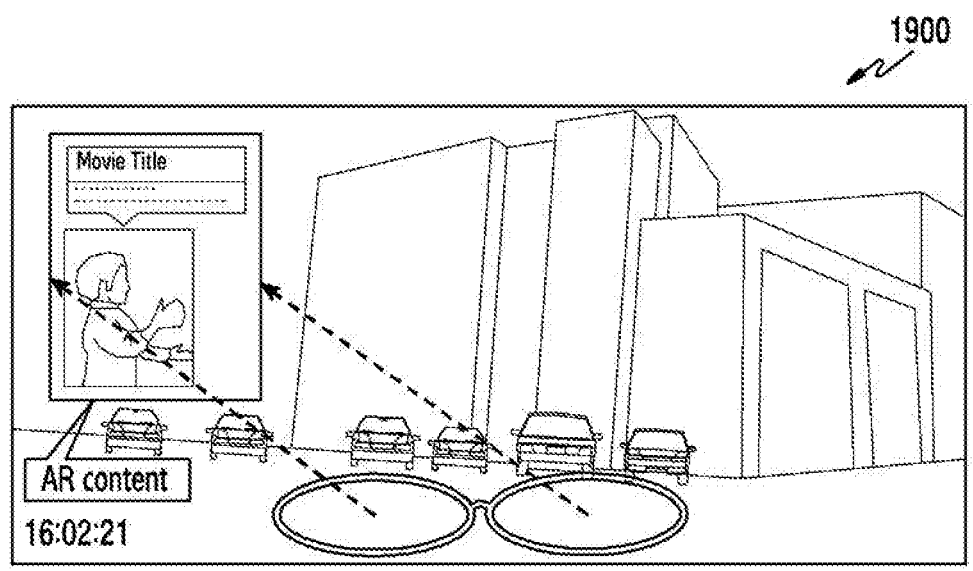

In FIG. 19A, a user is wearing an AR device 102 and is travelling in a car. He is gazing at various objects coming on his way at 16:02:15. In FIG. 19B, the user is gazing at one particular object (movie poster) coming on his way at 16:02:16. In FIG. 19C, the user keeps gazing at the movie poster for more than a threshold time (~3 seconds). The system calculates content complexity of the poster. The system determines that the user needs 10 seconds to see the poster properly. In FIG. 19D, the user keeps turning his head and moves his eyes, to keep on gazing at movie poster. In FIG. 19E, the movie poster moves out of sight of the user as car keeps on moving. The user could watch the poster only for 5 seconds (from 16:02:16~16:02:21). The user keeps turning his head and eyes, to look at the move poster as long as possible. The system determines that the user is still interested in watching the poster. The user could not get sufficient time (10 sec as calculated by the system) to see the poster. In FIG. 19F, the system recreates best possible image of the poster along with additional information, and shows the image with the additional information in the AR device 102. This AR content does not block normal view. The content will be shown to the user till "16:02:26", (for 5 more seconds) or till the user is interested in the content.

Figure 20A:
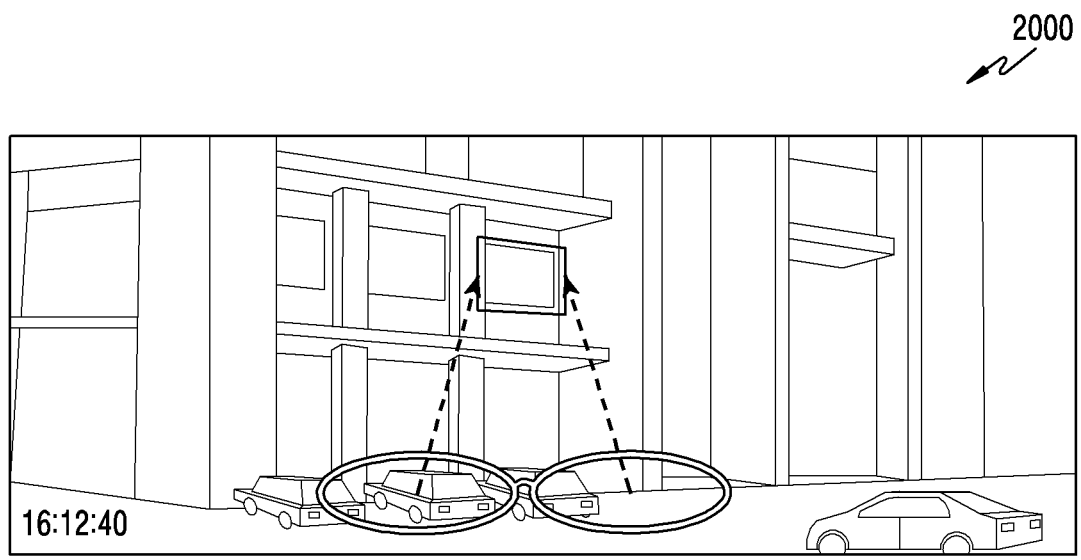
FIGS. 20A-20C illustrate a use-case scenario depicting an intentional disappearance despite the interest, due to relative motion between a user and an object, according to an exemplary embodiment of the disclosure.
Figure 20B:
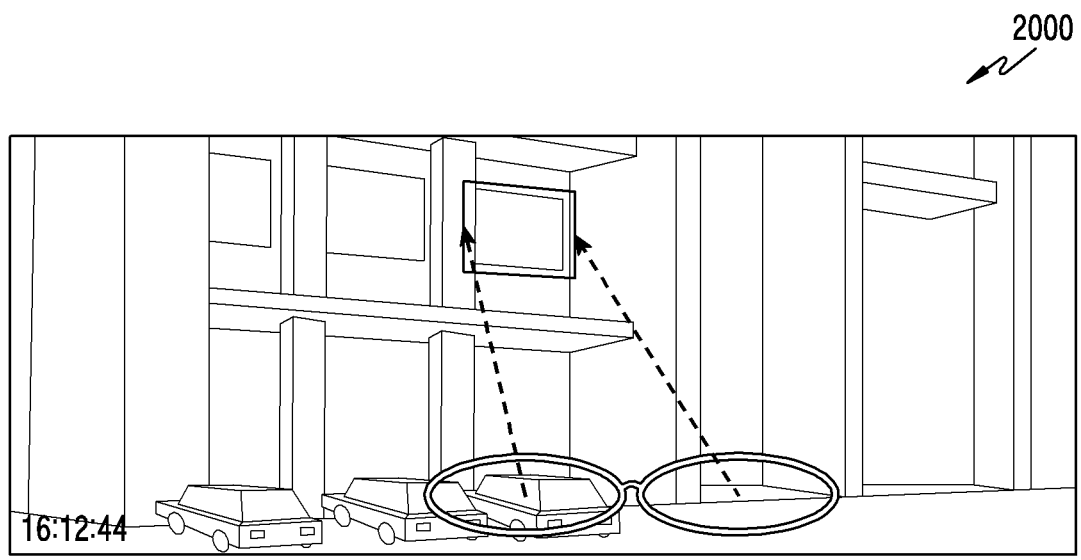
Figure 20C:
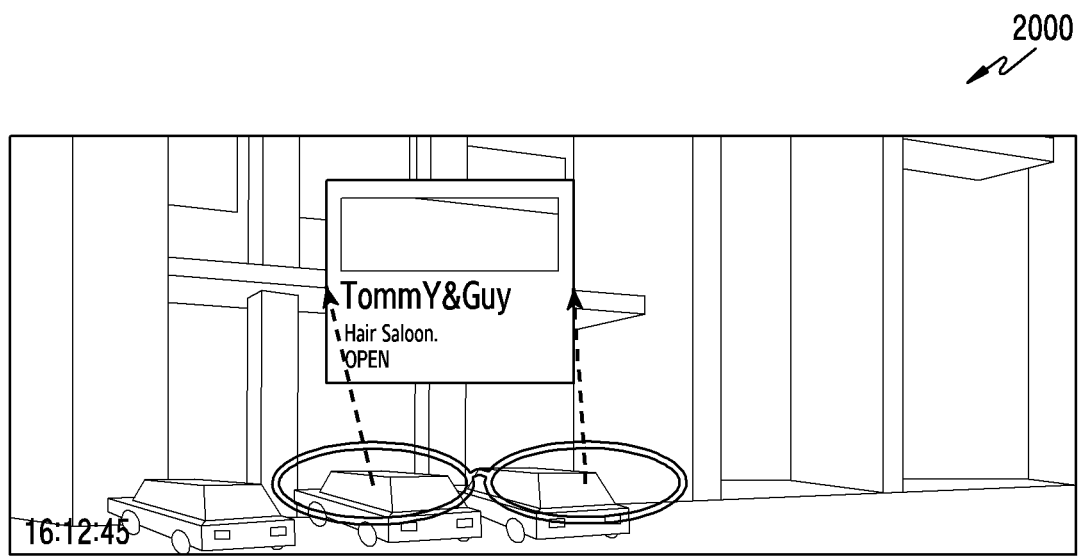

FIGS. 20A-20C illustrate a use-case scenario 2000 depicting an intentional disappearance despite the interest due to light/visibility and other environmental conditions, according to an exemplary embodiment of the disclosure.

In FIG. 20A, a user is checking the text written on a glass of a shop. In FIG. 20B, the user shows his interest in the text written on the glass by turning his head and gaze towards the text. The text is difficult to read because of glare, font color, background and lighting. The user keeps moving his head and eyes towards the text. In FIG. 20C, the user walks past the shop. He is unable to read the text on the glass completely due to glare, font color, background and lighting. The system 100 identifies that text was not clearly visible to the user. It recreates the text and shows it with augmented information to the user in the AR device 102.

FIGS. 21A-21F illustrate a use-case scenario 2100 depicting disappearance of AR content of the previous object of interest, according to an exemplary embodiment of the disclosure.

Figure 21A:
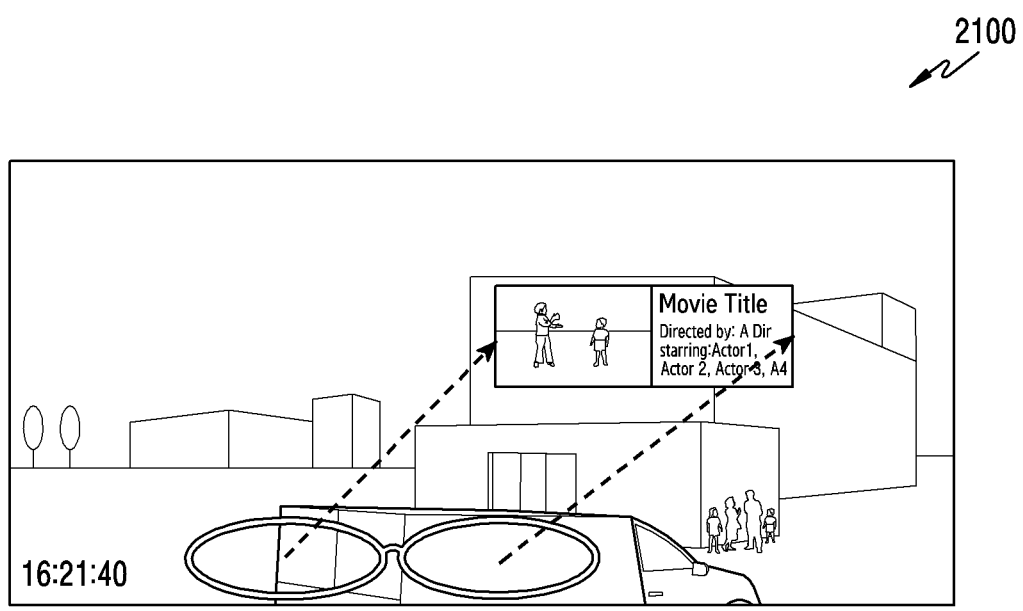
FIGS. 21A-21F illustrate a use-case scenario depicting disappearance of an augmented reality (AR) content of the previous object of interest, according to an exemplary embodiment of the disclosure.
Figure 21B:
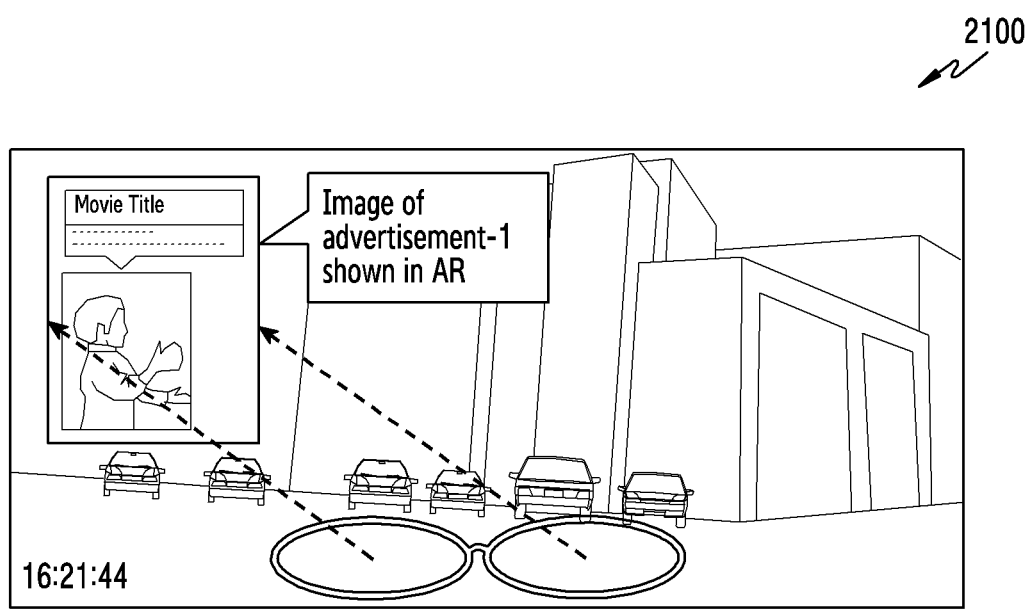
Figure 21C:
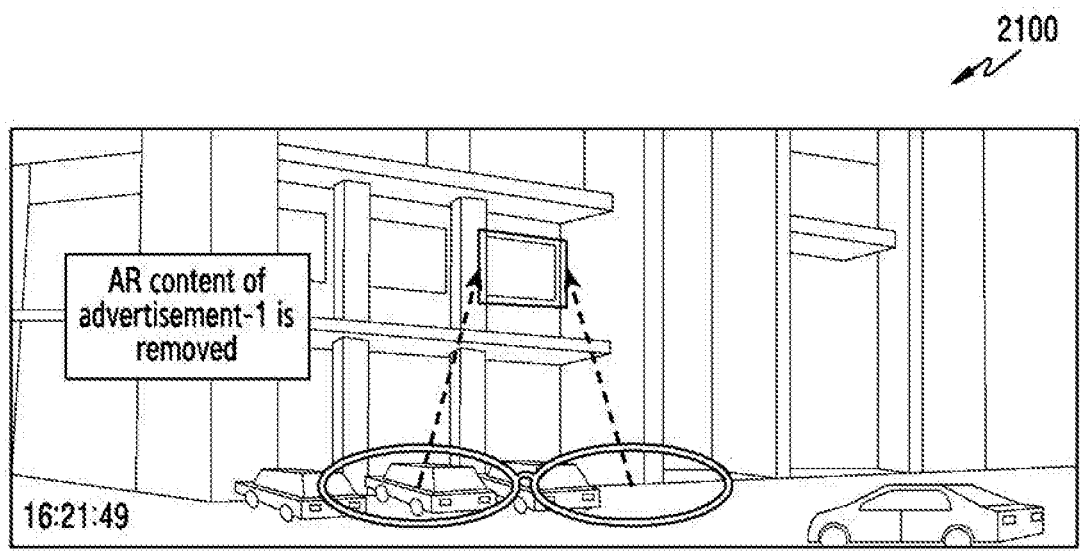
Figure 21D:
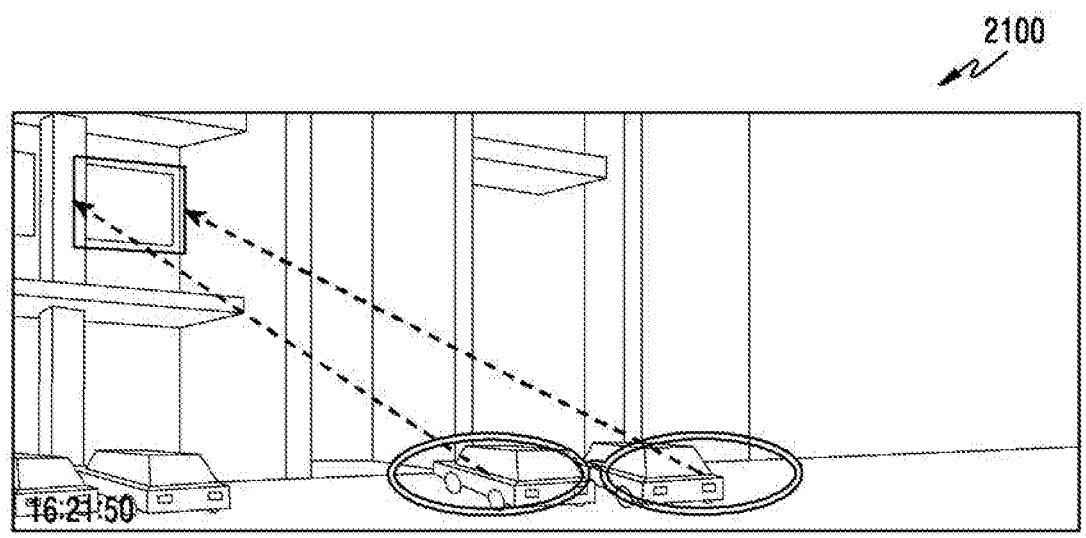
Figure 21E:
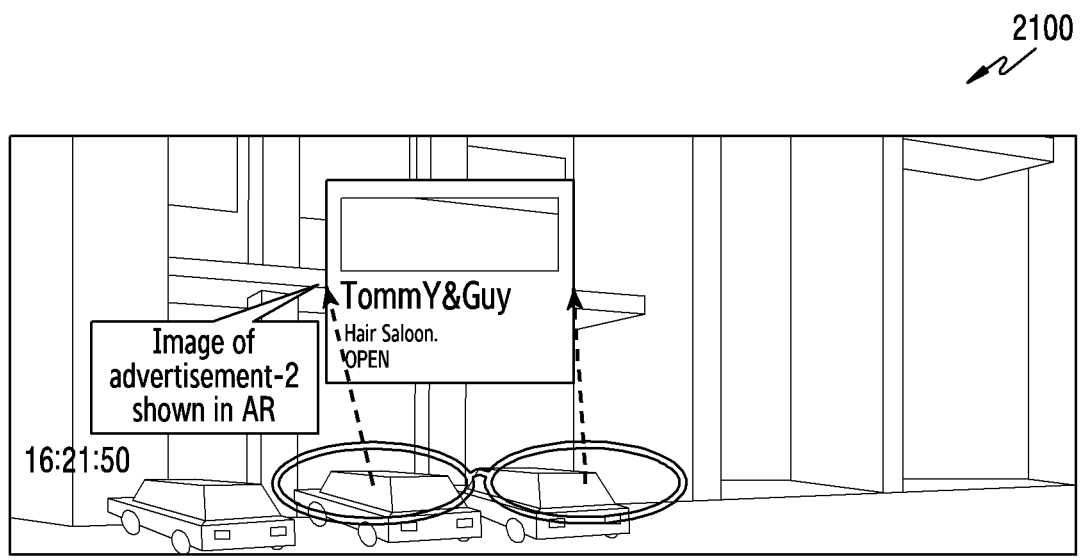
Figure 21F:
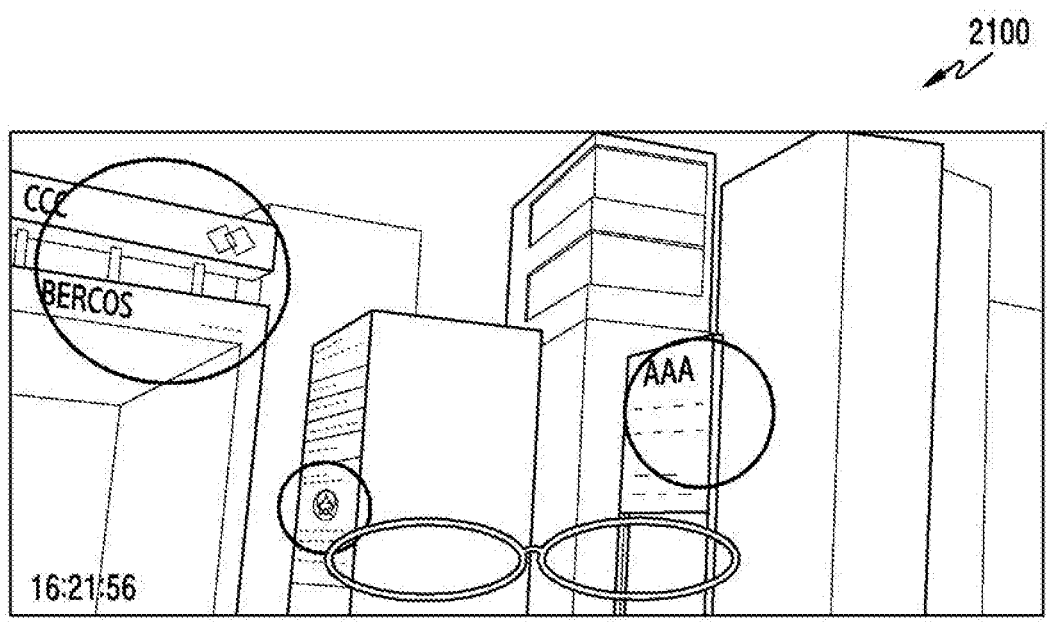

In FIG. 21A, a user is travelling in a car. He has been reading a road side advertisement-1 board for more than threshold amount of time. His car moves forward before he finished reading board. In FIG. 21B, an advertisement-1 goes out of Mr. A's view. The system 100 determines that the user is still interested in the advertisement-1. The system 100 creates a virtual image of the advertisement-1 and shows the virtual image in the user's AR device 102. In FIG. 21C, the user has not finished reading the advertisement-1 content in the AR device 101. However, he moves his head and eye gaze towards another interesting road side advertisement-2 in his view. The system 100 removes the AR content of advertisement-1. In FIG. 21D, the user watches an advertisement-2 for more than a threshold amount of time. The advertisement-2 goes out of the user's view. The system 100 determines that the user is still interested in the advertisement-2. In FIG. 21E, the system 100 creates a virtual content of advertisement-2 also and shows the virtual content in the user's AR device. In FIG. 21F, a virtual image of the advertisement-2 times out and disappears after the user has completed watching the virtual image. The user continues travelling in a car and continues gazing at various objects coming on his way.

Figure 22A:
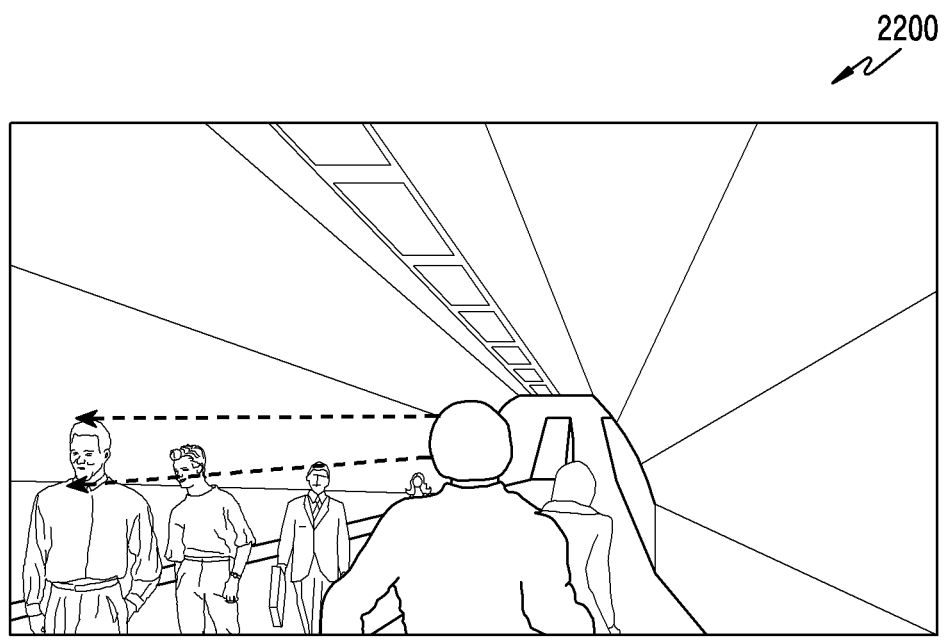
FIGS. 22A-22C illustrate a use-case scenario depicting intentional and non-obstructive disappearance, according to an exemplary embodiment of the disclosure.
Figure 22B:
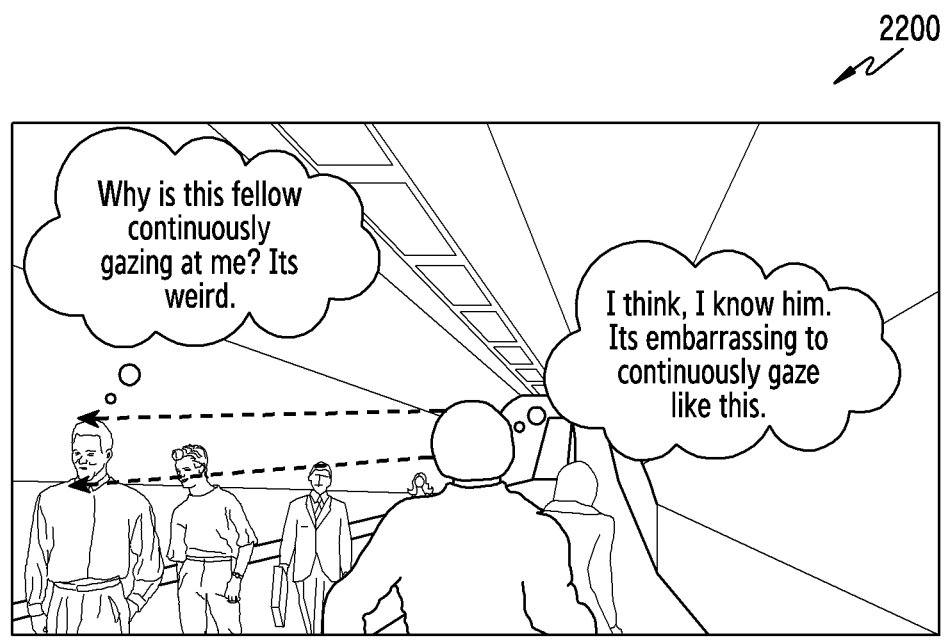
Figure 22C:
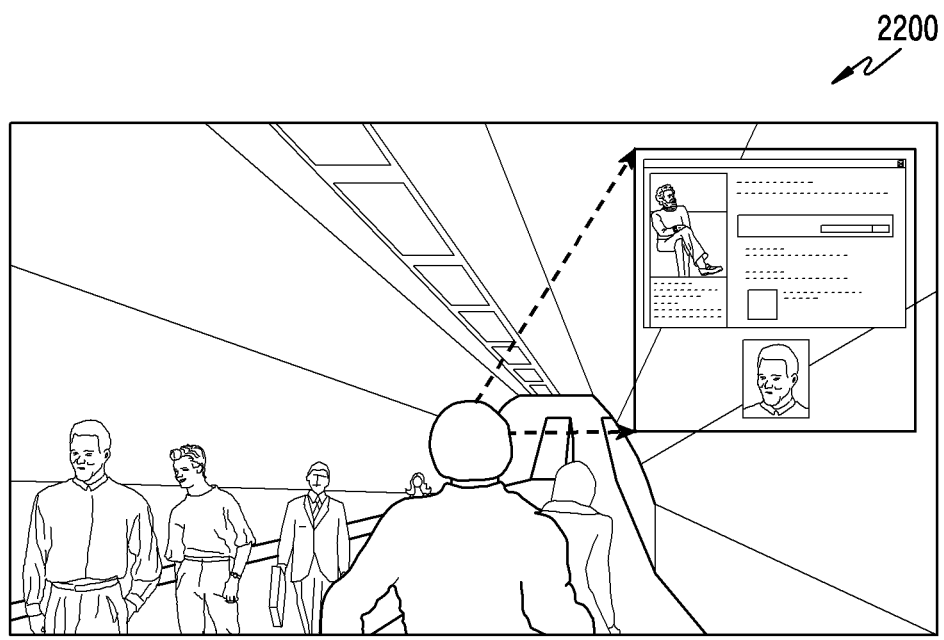

FIGS. 22A-22C illustrate a use-case scenario 2200 depicting intentional and non-obstructive disappearance, according to an exemplary embodiment of the disclosure.

In FIG. 22A, a user sees a stranger on an escalator going in opposite direction. He doubts if he has seen the stranger somewhere. He keeps turning his head to see the stranger's face. In FIG. 22B, the user has less time to see the stranger properly. He continuously gazes at the stranger. It makes both of them uncomfortable. In FIG. 22C, the stranger walks past the user. The user obtains information of the stranger in his AR device 102

FIGS. 23A-23F illustrate a use-case scenario 2300 depicting un-intentional obstructive disappearance of a car where a high speed racing car disappears quickly from user's view, according to an exemplary embodiment of the disclosure.

Figure 23A:
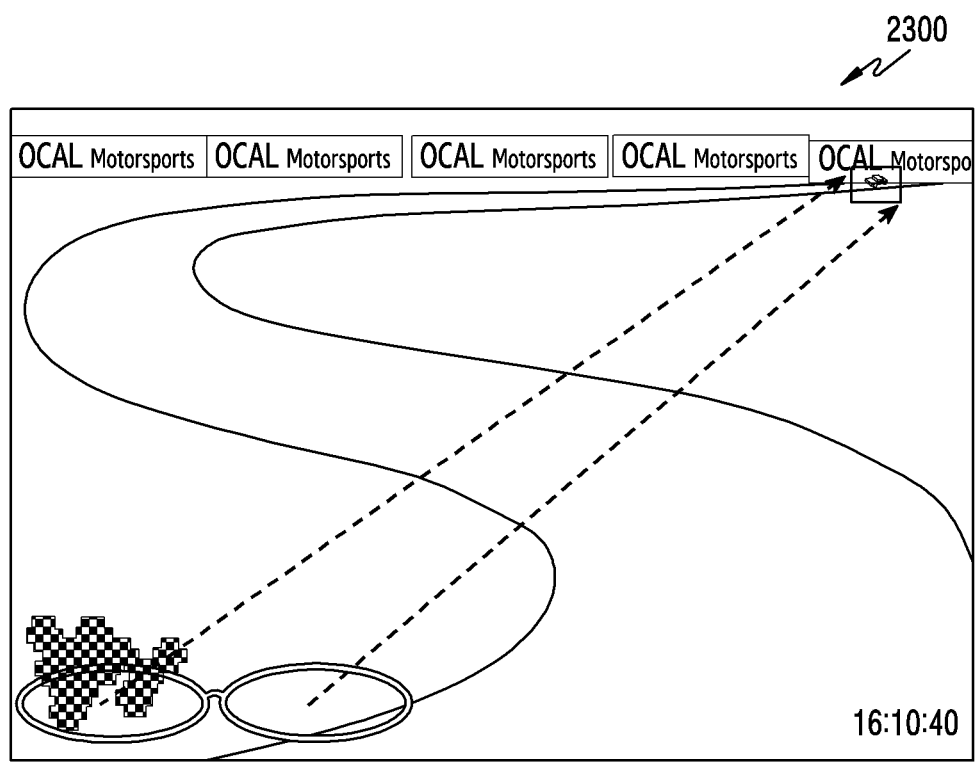
FIGS. 23A-23F illustrate a use-case scenario depicting un-intentional obstructive disappearance of a car where a high speed racing car disappears quickly from user's view, according to an exemplary embodiment of the disclosure.
Figure 23B:
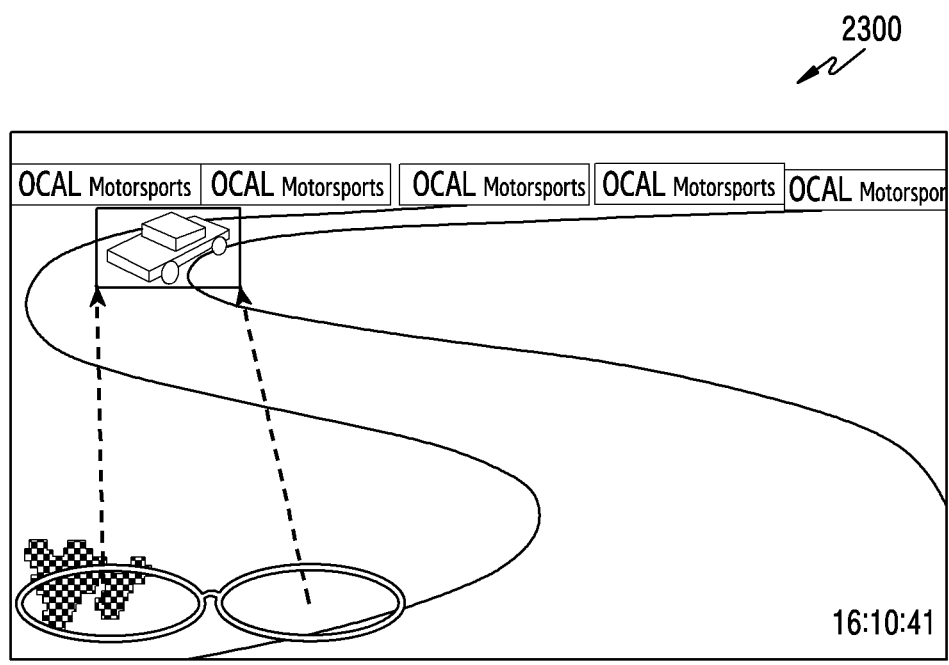
Figure 23C:
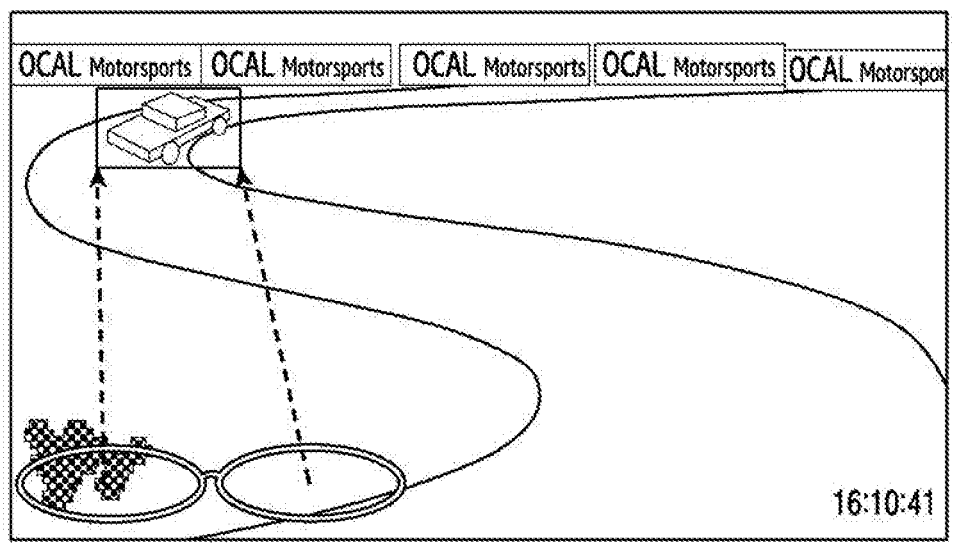
Figure 23D:
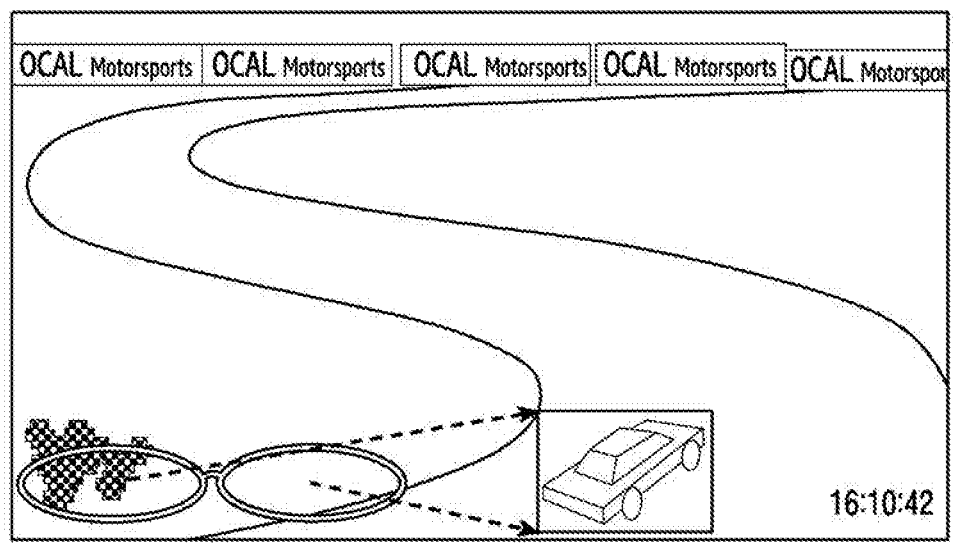
Figure 23E:
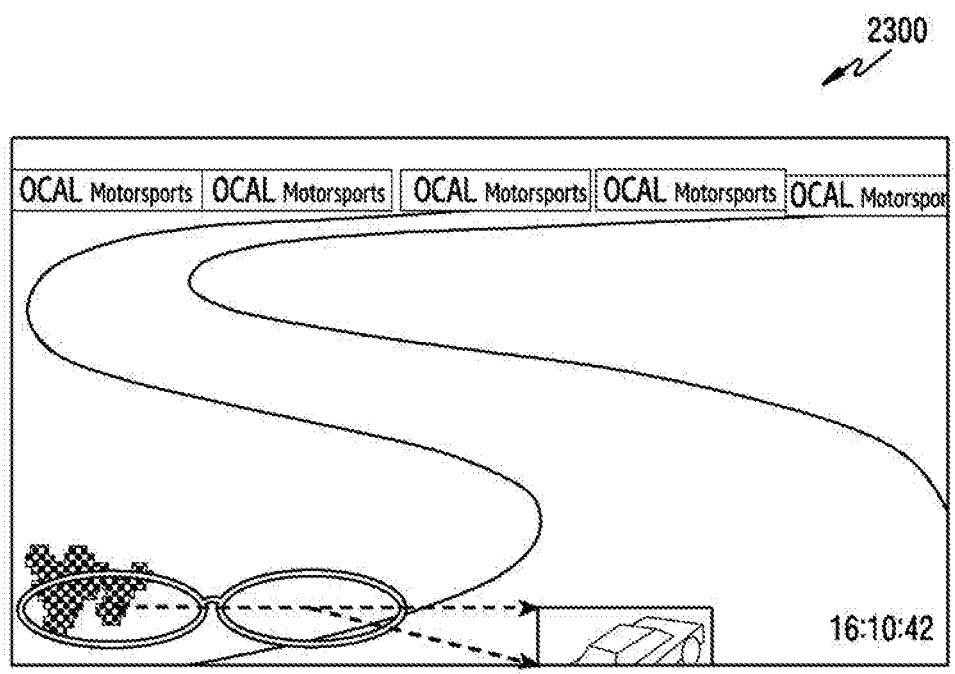
Figure 23F:
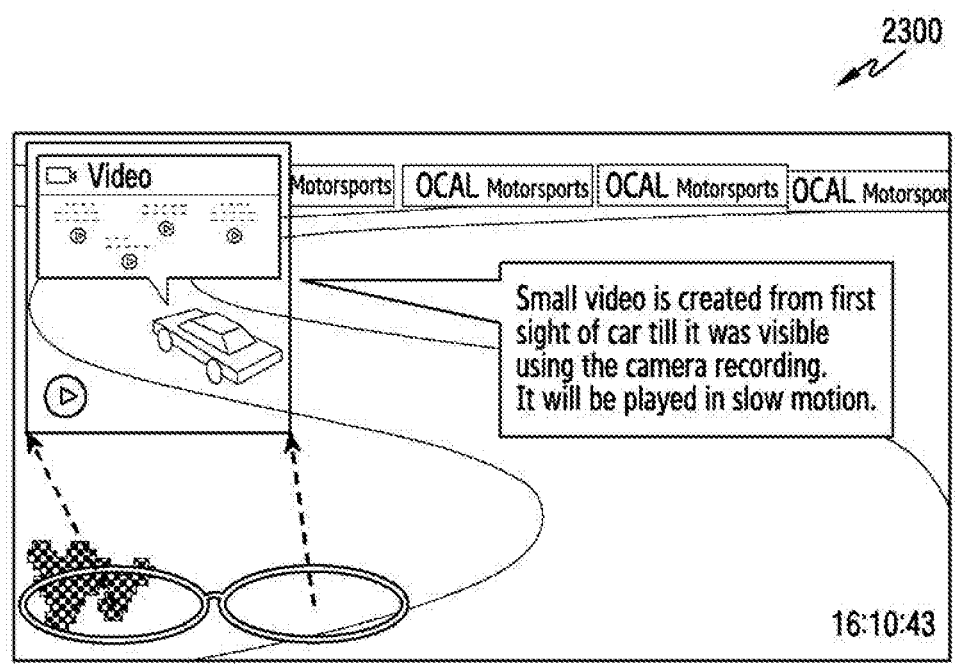

In FIG. 23A, a user is watching a car racing. Cars are passing him at a very high speed. A car enters and leaves the field of vision of the user even before a threshold time. In FIG. 23B, the user has only 2 seconds to look at any car before it goes out of his view. This time is less than the threshold time required to consider a car as an object of interest. When a car approaches him, he is gazing at only the car and his head is turning fast to follow the car. Multiple factors are considered by the system to identify an object of interest. In this case, the user is watching only one object as soon as it is visible and watches the object till the object disappears. Since head movement and eye gaze are more prominent, weightage of a threshold time is reduced and the car is considered as an object of interest. In FIG. 23C, the user has to turn his head quickly to see a car. In FIG. 23D, the car quickly goes out of the user's view. The user keeps moving his head and eyes towards the car. In this case, the user is watching only one object as soon as the object is visible and watches the object till the object disappears. Total time of visibility of the object is very less. Since head movement and eye gaze are more prominent, the threshold time is reduced, and the car is considered as an object of interest. Multiple factors are considered to identify an object of interest. In FIG. 23E, the car goes out of the user's sight. The system calculates object complexity and identifies that car movement was very fast. The system 100 creates a video from the camera recording and shows the video in the AR device 102 in slow playback speed as shown in FIG. 23F.

Figure 24:
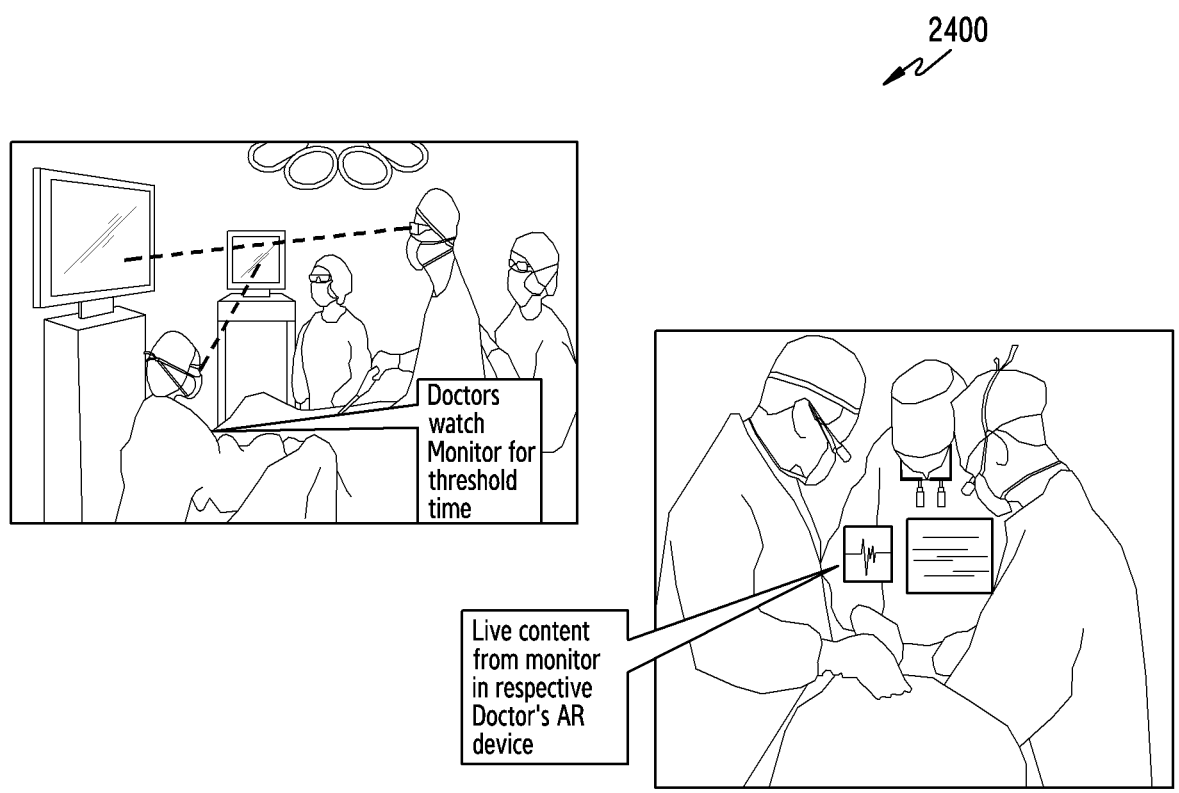
FIG. 24 illustrate a use-case scenario depicting a process of performing mirroring the content of the object of interest displayed on one or more computing devices, according to an exemplary embodiment of the disclosure.

FIG. 24 illustrates a use-case scenario 2400 depicting a process of performing mirroring the content of the object of interest displayed on one or more computing devices, according to an exemplary embodiment of the disclosure.

Specifically, FIG. 24 illustrates live reading of a heart beat monitor on AR glasses of a doctor performing an operation. During the operation, the doctors are wearing AR devices and watch heart beat monitors continuously. The AR devices keep a track of the heart beat monitors for threshold time. As the doctors turn their heads towards the operation table, the live data from the heart beat monitors is transferred to the respective AR devices.

In an embodiment, a computer implemented method for displaying contents on an augmented reality (AR) device. The method may comprise capturing a field of view of a user, recording the captured field of view, tracking a vision of the user towards one or more objects in the recorded field of view, determining at least one object of interest in the recorded field of view, identifying a frame containing disappearance of the determined object of interest in the recorded field of view, analysing the identified frame based on at least one disappearance of the object of interest, generating analysed data based on the analysed frame, and displaying a content of the object of interest based on the analysed data, on the augmented reality (AR) device.

The identifying the frame may be based on intentional disappearance or un-intentional disappearance of the object of interest in the recorded field of view.

The analysing the identified frame may be based on intentional disappearance or un-intentional disappearance of the object of interest in the recorded field of view.

The method may further comprise storing, in a database, the recorded field of view, pre-defined time intervals, pre-defined object categories, and data related to one or more objects, pre-determined angles of rotation, and speed of rotation of the user on at least one angle towards the one or more objects.

The analysing the identified frame may be based on intentional disappearance and comprises identifying a lack of the user's interest towards the one or more objects.

The determining the at least one object of interest may be performed using a threshold time.

The identifying the frame may be based on a vision time and a threshold time.

The analysing the identified frame may be based on the un-intentional disappearance comprises determining an obstruction between the user and the object of interest.

The obstruction between the user and the object of interest may be determined based on vision analysis, object identification, eye movement, head movement, or gaze fixation time for another object after disappearance of the object of interest.

The obstruction between the user and the object of interest may be determined by using a plurality of sensors.

The tracking the vision of the user may be based on at least one of parameters including eye gaze, direction of eye movement, direction of head movement, dilation of pupils, a number of eye blinks, an angle of rotation of head, speed of rotation of head, facial expression, widening of eye size, pupil and iris movement, and voice recognition.

The analysing the identified frame based on intentional disappearance may comprise analysing a vision of the user with respect to the object of interest for a pre-defined time interval, identifying intentional non-obstructive disappearance of the object of interest using an artificial intelligence based multi-parameter model, wherein the model comprises parameters related to the user's eye movement, the user's engagement level, companions with the user, and an object category, profiling viewing data and data received from sensors for a threshold time, and identifying gaze at a pre-determined location of the AR device.

The intentional disappearance of the object may be a disappearance despite the user's interest in the object.

The method may further comprise determining a probability of user's expectation on the field of view based on despite of user's interest in the object.

In another embodiment, the method may further comprise identifying lack of the user's interest in the object.

The displaying the content of the object of interest may comprise displaying a segment of the object of interest, or a modified version of the object of interest, on the augmented reality (AR) device.

The modified version of the object of interest may be generated by filtering and enhancement of the segment of the object of interest.

The method may further comprise computing a time required by the user for viewing the object of interest based on an object information.

The computing the time required by the user for viewing the object of interest may be determined based on a total time required by the user to view the object of interest and duration for which the user has viewed the object of interest before disappearance.

The filtering and enhancement of the segment of object of interest may comprise filtering and enhancing an image, a video, augmented information related to the object of interest, and the combinations thereof.

The method may further comprise rendering the positioning of the content on the AR device based on gaze of the user, user's preferences, and current view content.

The method may further comprise highlighting the object of interest based on gaze at a pre-defined location in the AR device, and a threshold time.

The method may further comprise detecting and recognizing the object of interest from the identified frame using a deep learning technique, wherein the deep learning technique comprises an object recognition technique, a deep structured learning technique, a hierarchy learning technique, or a neural network.

The method may further comprise transmitting the analysed data from the augmented (AR) device to another augmented (AR) device by using location of another augmented reality (AR) device, Artificial Intelligence technique, or using profile, and displaying a content of the object of interest based on the analysed data, on the another augmented reality (AR) device.

The method may further comprise performing mirroring the content of the object of interest displayed on one or more computing devices, on the AR device, in case of un-intentional disappearance of the object of interest or intentional disappearance of the object of interest despite the interest, and when the user views the object of interest for more than a threshold amount of time.

In another embodiment, a computer implemented system for displaying contents on an augmented reality (AR) device comprises a memory configured to store pre-defined rules, a processor configured to cooperate with the memory, the processor being configured to generate system processing commands based on the pre-defined rules, a capturing module configured to capture a field of view of a user, a recording module configured to record the captured field of view, a user input controller configured to track a vision of the user towards one or more objects in the recorded field of view, and a server configured to cooperate with the AR device, the recording module, and the user input controller. The server may comprise a determination module configured to determine at least one object of interest in the recorded field of view, an identifier configured to cooperate with the determination module to receive the determined object of interest, wherein the identifier is configured to identify a frame containing disappearance of the determined object of interest in the recorded field of view, and an analyser configured to cooperate with the identifier to receive the identified frame, wherein the analyser is configured to analyse the identified frame based on at least one disappearance of the object of interest, and generate analysed data, and a display module configured to display a content of the object of interest based on the analysed data, on the augmented reality (AR) device.

The AR device may be associated with the user.

The identifier may be configured to identify the frame based on intentional disappearance or un-intentional disappearance of the object of interest in the recorded field of view.

The analyser may be configured to analyse the identified frame based on intentional disappearance or un-intentional disappearance of the object of interest in the recorded field of view.

The system may further comprise a database configured to store the recorded field of view, pre-defined time intervals, pre-defined object categories, and data related to one or more objects, pre-determined angles of rotation, and speed of rotation of the user on at least one angle towards the one or more objects.

The analyser may be configured to analyse the identified frame based on intentional disappearance by identifying a lack of the user's interest towards the one or more objects.

The identifier may be configured to identify the frame based on a vision time and a threshold time.

The analyser may be configured to analyse the identified frame based on un-intentional disappearance by determining an obstruction between the user and the object of interest.

The user input controller may be configured to track the vision of the user based on at least one of parameters including eye gaze, direction of eye movement, direction of head movement, dilation of pupils, a number of eye blinks, an angle of rotation of head, speed of rotation of head, facial expression, widening of eye size, pupil and iris movement, and voice recognition.

The analyser may be configured to analyse the identified frame based on intentional disappearance, and the analyser may be configured to analyse a vision of the user with respect to the object of interest for a pre-defined time interval, identify intentional non-obstructive disappearance of the object of interest using an artificial intelligence based multi-parameter model, wherein the model comprises parameters related to the user's eye movement, the user's engagement level, companions with the user, an object category, profile viewing data and data received from sensors for a threshold time, and identify gaze at a pre-determined location of the AR device.

The intentional disappearance of the object may be a disappearance despite the user's interest in the object.

The analyser may comprise an estimation module configured to determine a probability of user's expectation on the field of view based on despite of user's interest in the object.

The analyser may be configured to identify lack of the user's interest in the one or more objects.

The display module may be configured to display a content of the object of interest that comprises a segment of the object of interest, or a modified version of the object of interest, on the augmented reality (AR) device.

The server may further comprise a complexity identifier configured to compute a time required by the user for viewing the object of interest based on an object information.

The complexity identifier may be configured to compute the time required by the user to view the object of interest based on a total time required by the user to view the object of interest and duration for which the user has viewed the object of interest before disappearance.

The system may further comprise a content rendering module configured to render the positioning of the content on the AR device based on gaze of the user, the user's preferences, and current view content.

The display module may be configured to highlight the object of interest based on gaze at a pre-defined location in the AR device, and a threshold time.

The identifier further may comprise an object recognition module configured to detect and recognize the object of interest from the identified frame using a deep learning technique, wherein the deep learning technique comprises an object recognition technique, a deep structured learning technique, a hierarchy learning technique, or a neural network.

The user input controller may comprise an eye gaze tracking module configured to track the vision of the user by identifying eye gaze, direction of eye movement, dilation of pupils, a number of eye blinks, facial expression, widening of eye size, or pupil and iris movement.

The user input controller may comprise a head movement tracking module configured to track direction of head movement, an angle of rotation of head, or speed of rotation of head.

The user input controller may comprise a voice recognition module configured to track voice recognition of the user.

The server may further comprise a transmitter configured to transmit the analysed data from the augmented (AR) device to another augmented (AR) device by using location of the another augmented reality (AR) device, Artificial Intelligence technique, or using profile.

The display module may be configured to display a content of the object of interest based on the analysed data, on the another augmented reality (AR) device.

The display module may be configured to perform mirroring of the content of the object of interest displayed on one or more computing devices, on the AR device, in case of un-intentional disappearance of the object of interest or intentional disappearance of the object of interest despite the interest, and when the user views the object of interest for more than a threshold amount of time.

In another embodiment, a computer implemented method for displaying contents on an augmented reality (AR) device comprise capturing a field of view of a user, tracking an eye gaze of the user towards an object of interest in the captured field of view, identifying a frame containing intentional disappearance of the object of interest in the captured field of view, analysing the identified frame based on intentional disappearance, generating analysed data based on the analysed frame, and displaying a content of the object of interest based on the analysed data, on the augmented reality (AR) device.

In another embodiment, a computer implemented system for displaying contents on an augmented reality (AR) device comprises a memory configured to store pre-defined rules, a processor configured to cooperate with the memory, the processor being configured to generate system processing commands based on the pre-defined rules, a capturing module configured to capture a field of view of a user, a user input controller configured to track an eye gaze of the user towards an object of interest in the captured field of view, and a server configured to cooperate with the AR device, the capturing module, and the user input controller, and the server may comprise an identifier configured to identify a frame containing intentional disappearance of the object of interest in the captured field of view, and an analyser configured to cooperate with the identifier to receive the identified frame, wherein the analyser is configured to analyse the identified frame based on the intentional disappearance, and generate analysed data, and a display module configured to display a content of the object of interest based on the analysed data, on the augmented reality (AR) device.

In another embodiment, a computer implemented method for displaying contents on an augmented reality (AR) device comprises capturing a field of view of a user, recording the captured field of view, tracking an eye gaze of the user towards an object of interest in the recorded field of view, identifying a frame containing at least one of un-intentional disappearance of the object of interest, or intentional disappearance of the object of interest despite the interest in the recorded field of view, analysing the identified frame based on the at least one of un-intentional disappearance of the object of interest, or intentional disappearance of the object of interest despite the interest, generating analysed data based on the analysed frame, and displaying a content of the object of interest based on the analysed data, on the augmented reality (AR) device.

In another embodiment, a computer implemented system for displaying contents on an augmented reality (AR) device comprises a memory configured to store pre-defined rules, a processor configured to cooperate with the memory, the processor being configured to generate system processing commands based on the pre-defined rules, a capturing module configured to capture a field of view of a user, a recording module configured to record the captured field of view, a user input controller configured to track an eye gaze of the user towards an object of interest in the recorded field of view, and a server configured to cooperate with the AR device, the recording module, and the user input controller, the server comprising an identifier configured to identify a frame containing at least one of un-intentional disappearance of the object of interest, or intentional disappearance of the object of interest despite the interest in the recorded field of view, an analyser configured to cooperate with the identifier to receive the identified frame, the analyser being configured to analyse the identified frame based on the at least one of un-intentional disappearance of the object of interest, or intentional disappearance of the object of interest despite the interest, and generate analysed data, and a display module configured to display a content of the object of interest based on the analysed data, on the augmented reality (AR) device.

The above-described example embodiments may be implemented as a software program including an instruction stored on machine (e.g., computer)-readable storage media. The machine is an apparatus which is capable of calling a stored instruction from the storage medium and operating according to the called instruction.

When the command is executed by a processor, the processor may perform a function corresponding to the command directly or using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an example embodiment, the method according to the above-described various example embodiments may be provided as being included in a computer program product. The computer program product may be traded as a product between a seller and a consumer. The computer program product may be distributed in the form of (e.g., a compact disc read only memory (CD-ROM)) or through an application store. In the case of online distribution, at least a portion of the computer program product may be at least temporarily stored or temporarily generated in a server of the manufacturer, a server of the application store, or a storage medium such as memory.

Each of the components (e.g., module or program) according to the various example embodiments may include a single entity or a plurality of entities, and some of the corresponding sub components described above may be omitted, or another sub component may be further added to the various example embodiments. Alternatively or additionally, some of the components (e.g., module or program) may be integrated into one entity and may perform a function carried out by each of the corresponding components before integration in the same or similar manner. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the invention and the concepts contributed by the inventor(s) to furthering the art and are to be construed as being without limitation to such specifically recited examples and conditions. Moreover, all statements herein reciting principles, aspects, and embodiments of the invention, as well as specific examples thereof, are intended to encompass equivalents thereof

We claim:

1. A computer implemented method for displaying contents on an augmented reality (AR) device, the method comprising:
   capturing a field of view of a user;
   recording the captured field of view;
   tracking a vision of the user towards one or more objects in the recorded field of view;
   determining an object of interest in the recorded field of view;
   identifying a frame indicating disappearance of the object of interest in the recorded field of view;
   analyzing the identified frame based on the disappearance of the object of interest;
   generating analyzed data based on the analyzed frame; and
   displaying a content of the object of interest based on the analyzed data, on the AR device,
   wherein the analyzing the identified frame comprises:
   identifying whether the disappearance of the object of interest in the recorded field of view is intentional disappearance or un-intentional disappearance based on movement of the vision of the user, and
   in case that the disappearance of the object of interest is the intentional disappearance, identifying whether the intentional disappearance is intentional disappearance based on a lack of interest of the user or intentional disappearance despite the interest of the user,
   wherein the displaying the content of the object of interest on the AR device comprises displaying the content of the object of interest based on the intentional disappearance despite the interest of the user,
   wherein the intentional disappearance despite the interest of the user is identified based on a collective time duration of intermittent eye gazes of the user towards the object of interest,
   wherein the displaying the content of the object of interest based on the intentional disappearance despite the interest of the user comprises:
   calculating a content complexity of the object of interest,
   calculating a time duration corresponding to the content complexity, and
   displaying a multimedia content of the object of interest on the AR device for the calculated time duration, and
   wherein the calculating the time duration corresponding to the content complexity comprises calculating the time duration based on a difference between a total time required by the user to comprehend the object of interest and a duration for which the user has viewed the object of interest before the disappearance of the object of interest.

2. The method of claim 1, wherein the intentional disappearance despite the interest of the user is identified based on a direction of the vision of the user moving from the object of interest to another object and the collective time duration of intermittent eye gazes exceeding a threshold time.

3. The method of claim 1, wherein the method further comprises:
   identifying the lack of the interest of the user in the object, and
   wherein the analyzing the identified frame based on the un intentional disappearance comprises determining an obstruction between the user and the object of interest.

4. The method of claim 3, wherein the obstruction between the user and the object of interest is determined based on vision analysis, object identification, eye movement, head movement, or gaze fixation time for another object after disappearance of the object of interest, and
   wherein the obstruction between the user and the object of interest is determined by using a plurality of sensors.

5. The method of claim 1, wherein the method further comprises:
   storing, in a database, the recorded field of view, pre-defined time intervals, pre-defined object categories, and data related to the one or more objects, pre-determined angles of rotation, and speed of rotation of the user on at least one angle towards the one or more objects;
   rendering positioning of the content on the AR device based on gaze of the user, user's preferences, and current view content;
   highlighting the object of interest based on gaze at a pre-defined location in the AR device, and a threshold time;
   detecting and recognizing the object of interest from the identified frame using a deep learning technique, wherein the deep learning technique comprises an object recognition technique, a deep structured learning technique, a hierarchy learning technique, or a neural network;
   transmitting the analyzed data from the AR device to another augmented reality (AR) device by using location of the another augmented reality (AR) device, Artificial Intelligence technique, or using profile;
   displaying a content of the object of interest based on the analyzed data, on the another augmented reality (AR) device; and
   performing mirroring the content of the object of interest displayed on one or more computing devices, on the AR device, in case of un-intentional disappearance of the object of interest or intentional disappearance of the object of interest despite the interest, and when the user views the object of interest for more than a threshold amount of time.

6. The method of claim 1, wherein the analyzing the identified frame is based on intentional disappearance and comprises identifying the lack of the interest of the user towards the one or more objects,
   wherein the determining the object of interest is performed using a threshold time, and
   wherein the identifying the frame is based on a vision time and the threshold time.

7. The method of claim 1, wherein the tracking the vision of the user is based on at least one of parameters including an eye gaze, a direction of eye movement, a direction of head movement, a dilation of pupils, a number of eye blinks, an angle of rotation of head, a speed of rotation of head, facial expression, a widening of eye size, a pupil and iris movement, and voice recognition.

8. The method of claim 1, wherein the analyzing the identified frame based on the disappearance comprises:
   analyzing the vision of the user with respect to the object of interest for a pre-defined time interval;
   identifying intentional non-obstructive disappearance of the object of interest using an artificial intelligence based multi-parameter model, wherein the multi-parameter model comprises at least one of parameters related to eye movement of the user, engagement level of the user, companions with the user, and an object category;

profiling viewing data and data received from sensors for a threshold time;
identifying gaze at a pre-determined location of the AR device; and
determining a probability of expectation of the user on the field of view based on despite of user's interest in the object.

9. The method of claim 1, wherein the displaying the content of the object of interest comprises displaying a segment of the object of interest, or a modified version of the object of interest, on the AR device,
wherein the modified version of the object of interest is generated by filtering and enhancement of the segment of the object of interest, and
wherein the filtering and enhancement of the segment of the object of interest comprises filtering and enhancing an image, a video, augmented information related to the object of interest, and combinations thereof.

10. A computer implemented system for displaying contents on an augmented reality (AR) device, the system comprising:
a memory configured to store pre-defined rules;
a display;
a first processor configured to cooperate with the memory, wherein the first processor is configured to:
generate system processing commands based on pre-defined rules,
capture a field of view of a user,
record the captured field of view, and
track a vision of the user towards one or more objects in the recorded field of view,
wherein the system further comprises a server configured to cooperate with the AR device and the first processor,
wherein the server comprises a second processor configured to:
determine an object of interest in the recorded field of view, identify a frame indicating disappearance of the object of interest in the recorded field of view, and
analyze the identified frame based on the disappearance of the object of interest, and generate analyzed data, and
wherein the first processor is further configured to control the display to display a content of the object of interest based on the analyzed data, on the AR device,
wherein the second processor is further configured to:
identify whether the disappearance of the object of interest in the recorded field of view is intentional disappearance or un-intentional disappearance based on movement of the vision of the user, and
in case that the disappearance of the object of interest is the intentional disappearance, identify whether the intentional disappearance is intentional disappearance based on a lack of interest of the user or intentional disappearance despite the interest of the user,
wherein the first processor is further configured to control the display to display the content of the object of interest based on the intentional disappearance despite the interest of the user,
wherein the second processor is further configured to identify the intentional disappearance despite the interest of the user based on a collective time duration of intermittent eye gazes of the user towards the object of interest,
wherein the second processor is further configured to:
calculate a content complexity of the object of interest, and
calculate a time duration corresponding to the content complexity,
wherein the first processor is further configured to control the display to display a multimedia content of the object of interest on the AR device for the calculated time duration, and
wherein the second processor is configured to calculate the time duration corresponding to the content complexity based on a difference between a total time required by the user to comprehend the object of interest and a duration for which the user has viewed the object of interest before the disappearance of the object of interest.

11. The system of claim 10, wherein the second processor is further configured to identify the intentional disappearance despite the interest of the user based on a direction of the vision of the user moving from the object of interest to another object and the collective time duration of intermittent eye gazes exceeding a threshold time.

12. The system of claim 10, wherein the second processor is further configured to analyze the identified frame based on un-intentional disappearance by determining an obstruction between the user and the object of interest, and
identify the lack of the interest of the user in the one or more objects.

13. The system of claim 10, wherein the system further comprises:
a database configured to store the recorded field of view, pre-defined time intervals, re-defined object categories, and data related to the one or more objects, pre-determined angles of rotation, and speed of rotation of the user on at least one angle towards the one or more objects,
wherein the first processor is further configured to render positioning of the content on the AR device based on gaze of the user, preferences of the user, and current view content,
wherein the second processor is further configured to detect and recognize the object of interest from the identified frame using a deep learning technique, wherein the deep learning technique comprises an object recognition technique, a deep structured learning technique, a hierarchy learning technique, or a neural network,
wherein the server further comprises a transmitter configured to transmit the analyzed data from the AR device to another augmented reality (AR) device by using location of the another augmented reality (AR) device, Artificial Intelligence technique, or using profile,
wherein the display highlights the object of interest based on gaze at a pre-defined location in the AR device, and a threshold time, the display displays a content of the object of interest based on the analyzed data, on the another augmented reality (AR) device, and
wherein the display performs mirroring of the content of the object of interest displayed on one or more computing devices, on the AR device, in case of un-intentional disappearance of the object of interest or intentional disappearance of the object of interest despite the interest, and when the user views the object of interest for more than a threshold amount of time.

14. The system of claim 10, wherein the second processor is further configured to analyze the identified frame based on the un-intentional disappearance by determining an obstruction between the user and the object of interest,
wherein the first processor is further configured to track the vision of the user based on at least one of parameters comprising an eye gaze, a direction of eye movement, a direction of head movement, dilation of pupils, a number of eye blinks, an angle of rotation of head, a speed of rotation of head, facial expression, widening of eye size, a pupil and iris movement, and voice recognition, and wherein the second processor is further configured to identify the frame based on a vision time and a threshold time.

15. The system of claim 10, wherein the second processor is further configured to:
   analyze a vision of the user with respect to the object of interest for a pre-defined time interval;
   identify intentional non-obstructive disappearance of the object of interest using an artificial intelligence based multi-parameter model, wherein the multi-parameter model comprises parameters related to eye movement of the user, engagement level of the user, companions with the user, an object category;
   profile viewing data and data received from sensors for a threshold time; and
   identify gaze at a pre-determined location of the AR device, and
   wherein the second processor is further configured to compute a time required by the user for viewing the object of interest based on an object information.

16. The system of claim 10, wherein the display displays a content of the object of interest that comprises a segment of the object of interest, or a modified version of the object of interest, on the AR device.

17. The system of claim 10, wherein the first processor is further configured to track the vision of the user by identifying an eye gaze, a direction of eye movement, dilation of pupils, a number of eye blinks, facial expression, widening of eye size, or pupil and iris movement,
   wherein the first processor is further configured to track direction of head movement, an angle of rotation of head, or speed of rotation of head, and
   wherein the first processor is further configured to track voice recognition of the user.

18. A computer implemented method for displaying contents on an augmented reality (AR) device, the method comprising:
   capturing a field of view of a user;
   recording the captured field of view;
   tracking a vision of the user towards an object of interest in the recorded field of view;
   identifying a frame indicating at least one of un-intentional disappearance of the object of interest, or intentional disappearance of the object of interest despite the interest in the recorded field of view;
   analyzing the identified frame based on the at least one of un-intentional disappearance of the object of interest, or intentional disappearance of the object of interest despite the interest;
   generating analyzed data based on the analyzed frame; and
   displaying a content of the object of interest based on the analyzed data, on the AR device,
   wherein the analyzing the identified frame comprises:
   identifying the intentional disappearance and the un-intentional disappearance of the object of interest in the recorded field of view based on movement of the vision of the user,
   wherein the displaying the content of the object of interest on the AR device comprises displaying the content of the object of interest based on the intentional disappearance despite the interest of the user,
   wherein the intentional disappearance despite the interest of the user is identified based on a collective time duration of intermittent eye gazes of the user towards the object of interest,
   wherein the displaying the content of the object of interest based on the intentional disappearance despite the interest of the user comprises:
   calculating a content complexity of the object of interest,
   calculating a time duration corresponding to the content complexity, and
   displaying a multimedia content of the object of interest on the AR device for the calculated time duration, and
   wherein the calculating the time duration corresponding to the content complexity comprises calculating the time duration based on a difference between a total time requested by the user to comprehend the object of interest and a duration for which the user has seen the object of interest before the disappearance of the object of interest.

19. The method of claim 18, wherein the intentional disappearance despite the interest of the user is identified based on a direction of the vision of the user moving from the object of interest to another object and the collective time duration of intermittent eye gazes exceeding a threshold time.

* * * * *